United States Patent
Fujishiro

(10) Patent No.: US 9,875,677 B2
(45) Date of Patent: Jan. 23, 2018

(54) DISPLAY DEVICE, IMAGE PROCESSING DEVICE, AND IMAGE PROCESSING METHOD

(71) Applicant: JOLED Inc., Tokyo (JP)

(72) Inventor: Fumihiko Fujishiro, Tokyo (JP)

(73) Assignee: JOLED Inc., Tokyo (JP)

( * ) Notice: Subject to any disclaimer, the term of this patent is extended or adjusted under 35 U.S.C. 154(b) by 609 days.

(21) Appl. No.: 13/932,123

(22) Filed: Jul. 1, 2013

(65) Prior Publication Data
US 2014/0028734 A1    Jan. 30, 2014

(30) Foreign Application Priority Data
Jul. 25, 2012  (JP) .................................. 2012-164332

(51) Int. Cl.
 *G09G 3/20*       (2006.01)
 *G09G 3/3208*     (2016.01)
 *H04N 5/70*       (2006.01)

(52) U.S. Cl.
 CPC ............. *G09G 3/20* (2013.01); *G09G 3/2003* (2013.01); *G09G 3/3208* (2013.01); *G09G 2340/06* (2013.01); *G09G 2360/16* (2013.01); *H04N 5/70* (2013.01)

(58) Field of Classification Search
 CPC ...... G09G 3/20; G09G 3/3208; G09G 3/2003; G09G 2360/16; G09G 2340/06; H04N 5/70
 See application file for complete search history.

(56) References Cited

U.S. PATENT DOCUMENTS

| | | | |
|---|---|---|---|
| 2003/0122759 A1* | 7/2003 | Abe ......................... | G09G 3/22 345/89 |
| 2005/0057581 A1 | 3/2005 | Horiuchi et al. | |
| 2005/0083268 A1* | 4/2005 | Mori ....................... | G06F 3/147 345/76 |
| 2006/0158411 A1* | 7/2006 | Sakashita ................ | G09G 3/20 345/89 |
| 2009/0153537 A1 | 6/2009 | Tada et al. | |
| 2009/0174634 A1* | 7/2009 | Kohno .................. | G09G 3/3233 345/84 |
| 2010/0007679 A1* | 1/2010 | Sakaigawa ........... | G09G 3/3406 345/690 |
| 2010/0053137 A1* | 3/2010 | Park ...................... | G09G 3/3225 345/211 |
| 2010/0103187 A1* | 4/2010 | Linssen ................ | G09G 3/2003 345/590 |

(Continued)

FOREIGN PATENT DOCUMENTS

| | | |
|---|---|---|
| JP | 2003-134418 A | 5/2003 |
| JP | 2005-070426 A | 3/2005 |
| JP | 2008-026761 A | 2/2008 |

OTHER PUBLICATIONS

Japanese Office Action dated Mar. 15, 2016 for JP2012-164332.

*Primary Examiner* — Jose Soto Lopez
(74) *Attorney, Agent, or Firm* — Michael Best & Friedrich LLP

(57) ABSTRACT

An image processing device includes: a gain calculation section determining a gain, on the basis of a first partial image in a first frame image that includes a process target line; and a correction section correcting pixel luminance information regarding the process target line, on the basis of the gain.

4 Claims, 19 Drawing Sheets

(56) References Cited

U.S. PATENT DOCUMENTS

| | | | | |
|---|---|---|---|---|
| 2012/0206513 A1* | 8/2012 | Ueno | G09G 3/3413 | |
| | | | 345/697 | |
| 2012/0320274 A1* | 12/2012 | Funatsu | G09G 3/20 | |
| | | | 348/687 | |
| 2013/0057772 A1* | 3/2013 | Ishihara | G09G 3/3611 | |
| | | | 348/725 | |
| 2013/0106901 A1* | 5/2013 | Inada | G09G 3/3406 | |
| | | | 345/600 | |
| 2014/0028739 A1* | 1/2014 | Takahashi | G09G 3/2003 | |
| | | | 345/690 | |
| 2015/0009411 A1* | 1/2015 | Fujine | H04N 5/66 | |
| | | | 348/728 | |
| 2015/0070376 A1* | 3/2015 | Fujine | H04N 5/20 | |
| | | | 345/589 | |

\* cited by examiner

DISPLAY DEVICE, IMAGE PROCESSING DEVICE, AND IMAGE PROCESSING METHOD

BACKGROUND

The present disclosure relates to a display device that displays an image, and an image processing device and an image processing method that are used in such a display device.

Recently, cathode ray tube (CRT) display devices have been increasingly replaced by organic electro-luminescence (EL) or liquid crystal display devices. Organic EL or liquid crystal display devices, as described above, achieve slimmer packages than those of CRT display devices, thereby decreasing their footprints easily. In addition, they exhibit low power consumption, and are therefore advantageous in terms of ecology. Among of these display devices, in particular, organic EL display devices are attracting many attentions. Since organic EL display devices are self-luminous devices, they make it possible to further slim down their packages and decrease their power consumption.

For the purpose of decreasing the power consumption of display devices, as described above, many studies have been conducted. For example, Japanese Unexamined Patent Application Publication No. 2003-134418 discloses a display device equipped with an automatically brightness limit (ABL) function, which controls the display luminance of the screen in such a way that it does not excessively increase.

SUMMARY

For display devices, in general, a high image quality is in demand. More specifically, it is in demand that a display device does not cause a viewer to perceive any unnatural feeling when the ABL function is active.

It is desirable to provide a display device, an image processing device, and an image processing method, all of which enable the image quality to be enhanced.

A display device according to an embodiment of the present disclosure includes: a display section displaying an image by performing line sequential scanning; a gain calculation section determining a gain, on the basis of a first partial image in a first frame image that includes a process target line; and a correction section correcting pixel luminance information regarding the process target line, on the basis of the gain.

An image processing device according to an embodiment of the present disclosure includes: a gain calculation section determining a gain, on the basis of a first partial image in a first frame image that includes a process target line; and a correction section correcting pixel luminance information regarding the process target line, on the basis of the gain.

An image processing method according to an embodiment of the present disclosure includes: determining a gain, on the basis of a first partial image in a first frame image that includes a process target line; and correcting pixel luminance information regarding the process target line, on the basis of the gain.

In the display device, the image processing device, and the image processing method according to the above-described embodiments of the present disclosure, the gain is determined on the basis of a frame image, and the pixel luminance information regarding the process target line is corrected on the basis of the gain. The gain is determined on the basis of the first partial image in the first frame image that includes the process target line.

The display device, the image processing device, and the image processing method according to the above-described embodiments of the present disclosure are configured to determine the gain on the basis of the first partial image in the first frame image that includes the process target line. Therefore, all of the display device, the image processing device, and the image processing method achieve high image quality.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

Figure 1:
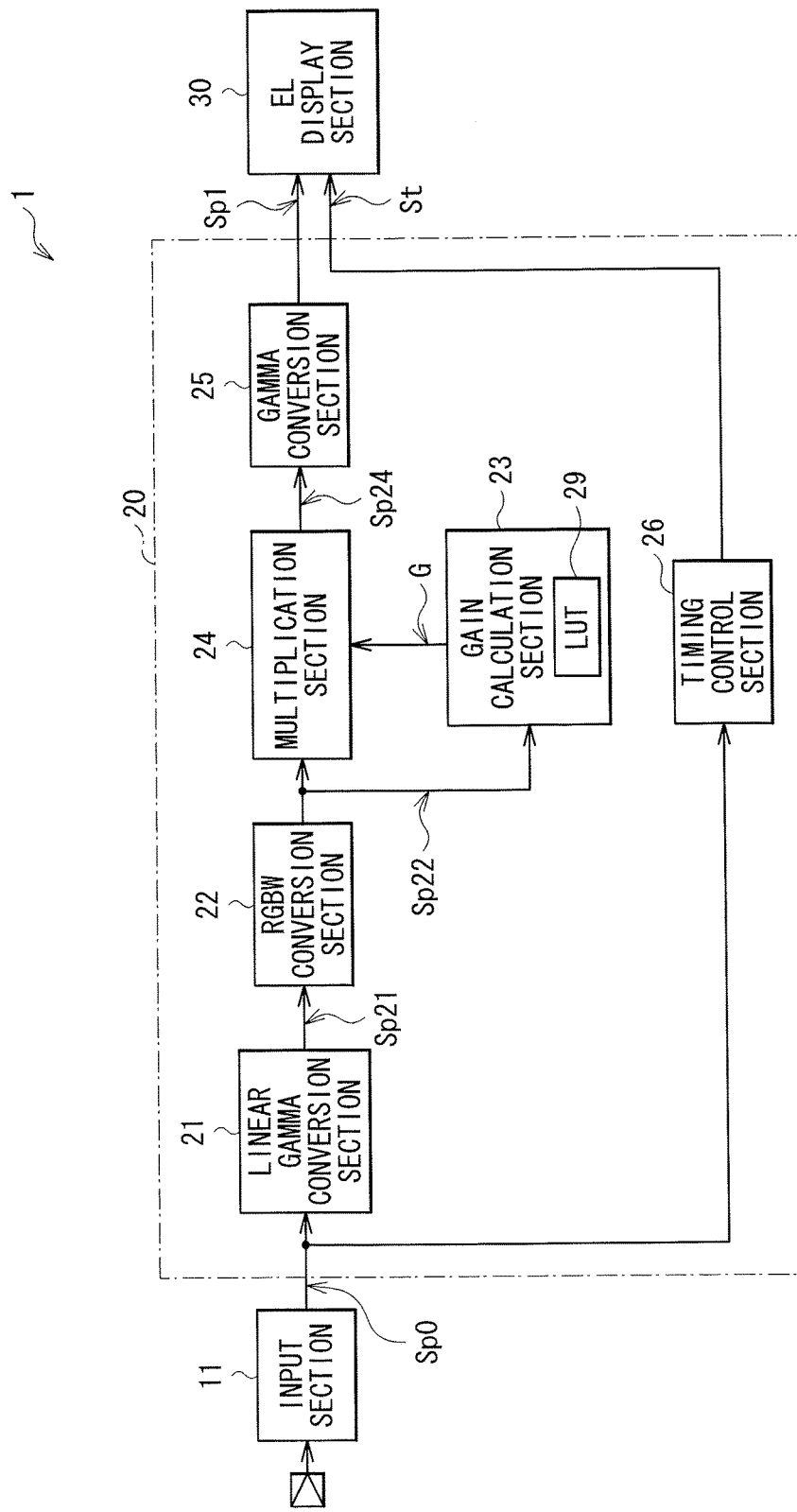
FIG. 1 is a block diagram of an exemplary configuration of a display device according to a first embodiment of the present disclosure.
Figure 4:
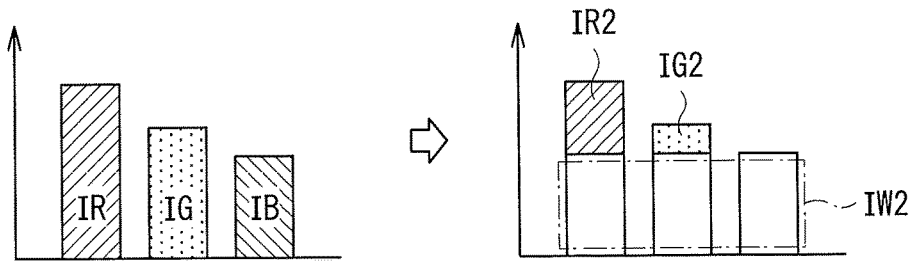

Left and right parts of FIG. 4 are explanatory views of an exemplary operation performed by an RGBW conversion section of FIG. 1.

Figure 5:
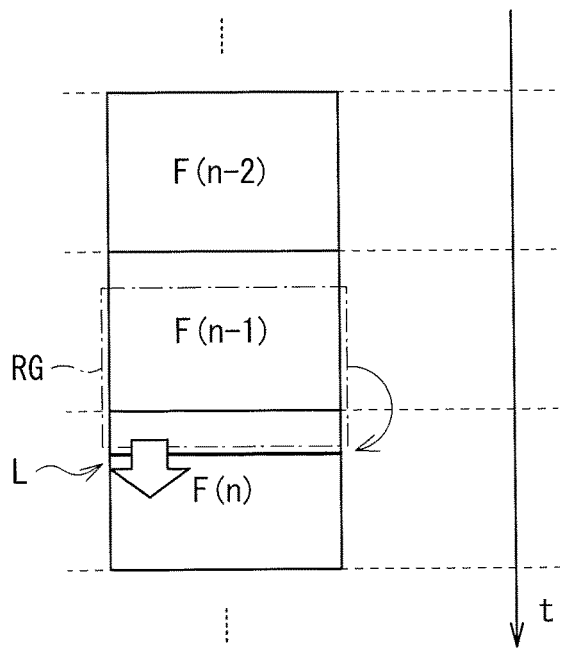

FIG. 5 is an explanatory view of an exemplary operation performed by a gain calculation section of FIG. 1.

Figure 6:
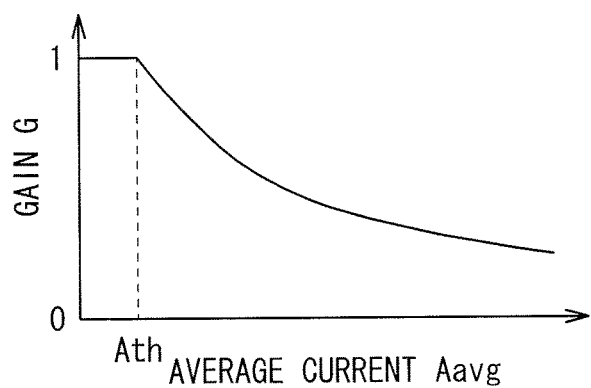

FIG. 6 is a diagram depicting an exemplary property of a LUT of FIG. 1.

Figure 7:
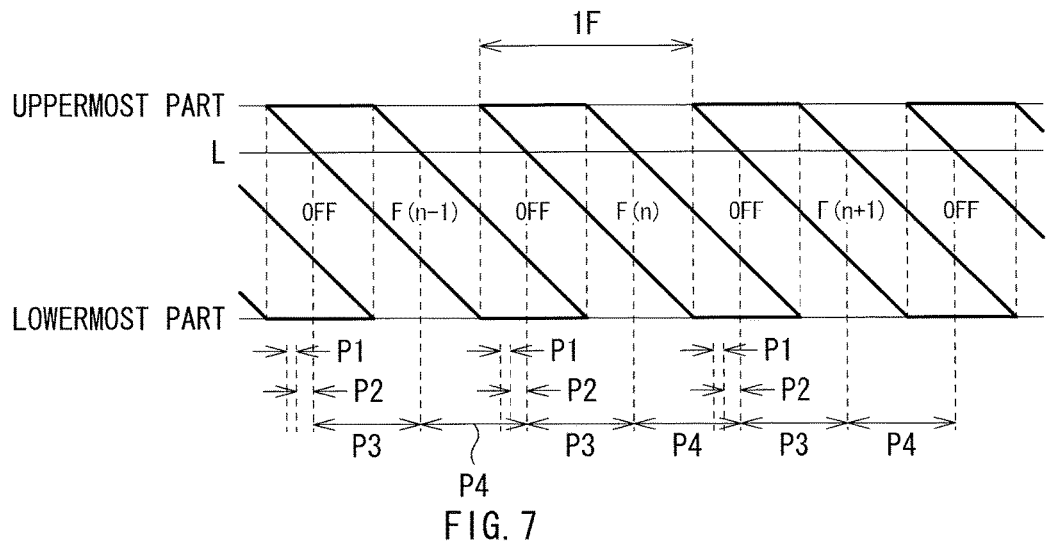

FIG. 7 is a timing chart in an exemplary operation performed by the EL display section of FIG. 1.

Figure 8:
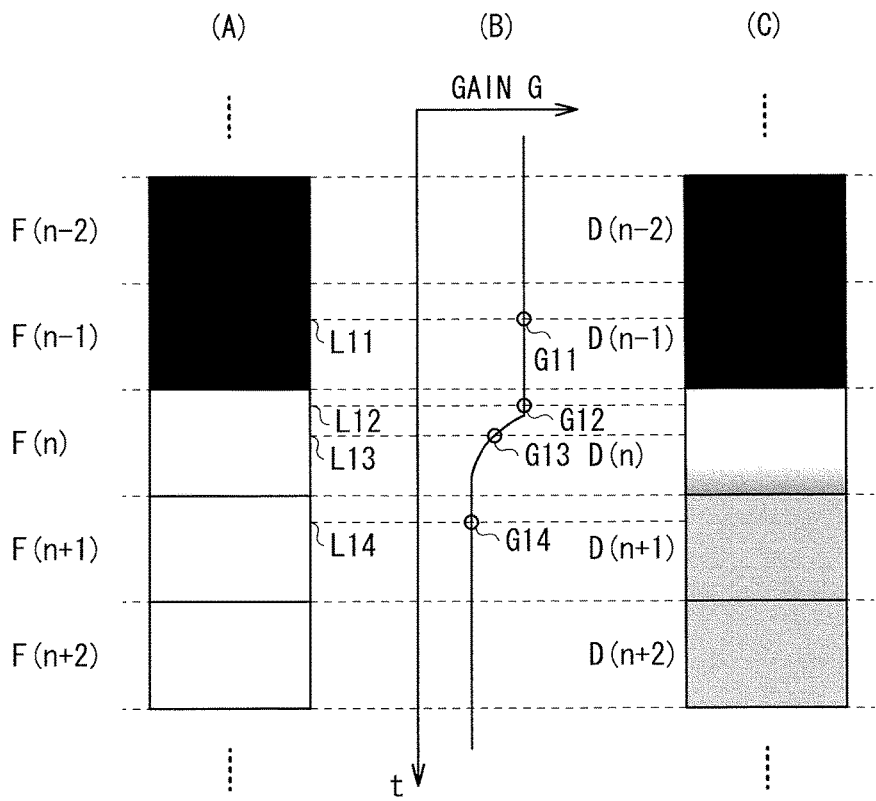

Parts (A), (B), and (C) of FIG. 8 are explanatory views of an exemplary operation performed by the display device of FIG. 1.

Figure 9:
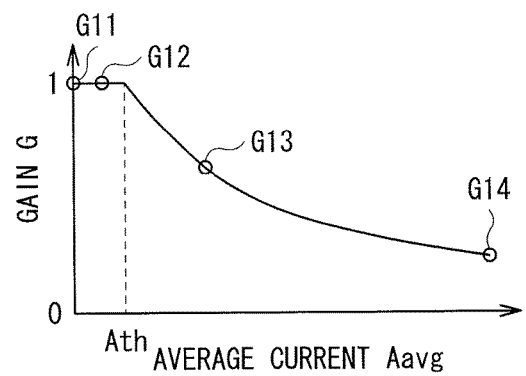

FIG. 9 is an explanatory view of an exemplary operation performed by the LUT of FIG. 1.

Figure 10:
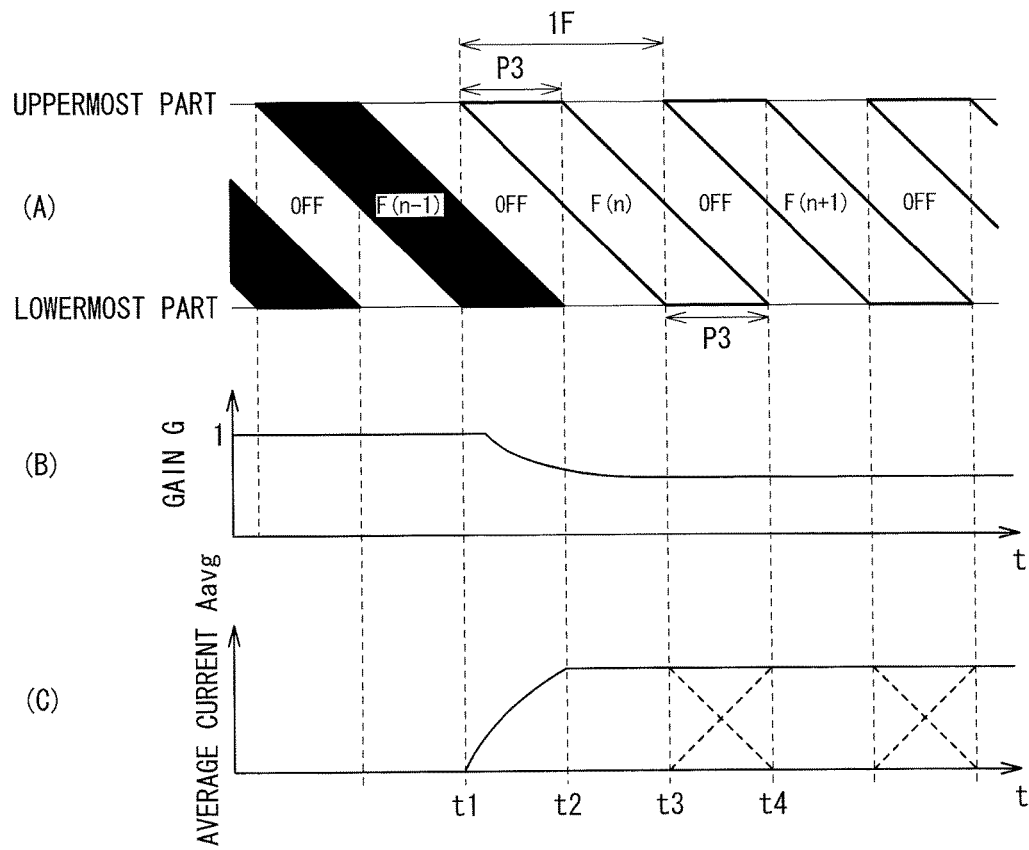

Parts (A), (B), and (C) of FIG. 10 are timing charts in another exemplary operation performed by the EL display section of FIG. 1.

Figure 11:
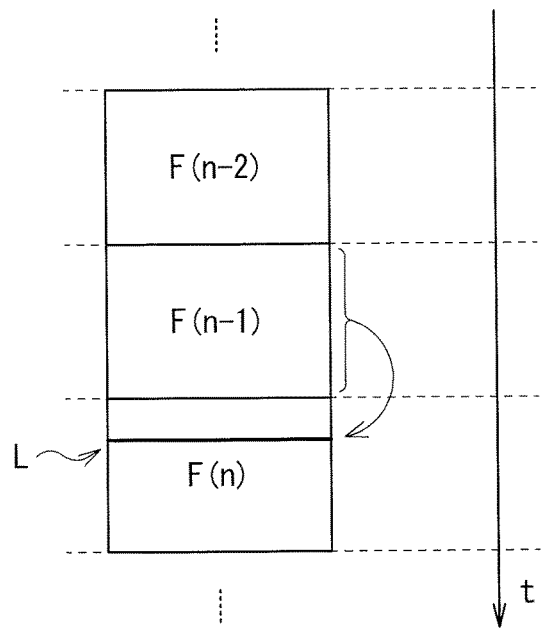

FIG. 11 is an explanatory view of an exemplary operation performed by a gain calculation section according to a comparative example.

Figure 12:
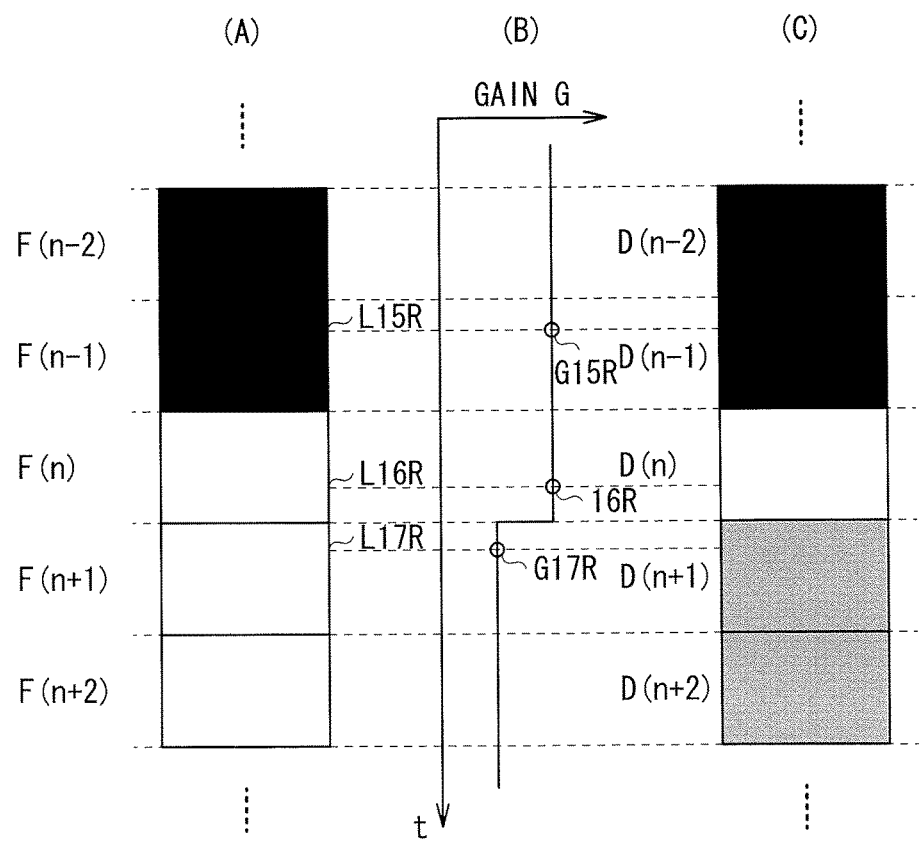

Parts (A), (B), and (C) of FIG. 12 are explanatory views of an exemplary operation performed by a display device according to the comparative example.

Figure 13:
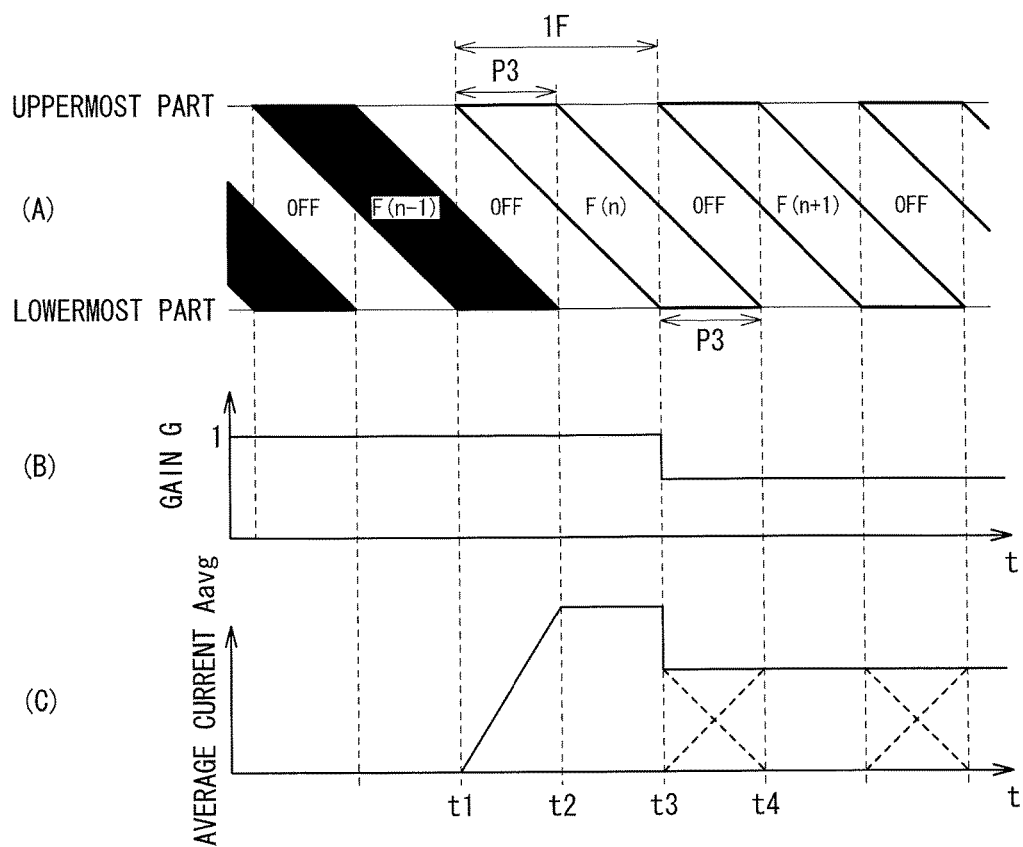

Parts (A), (B), and (C) of FIG. 13 are timing charts in an exemplary operation performed by an EL display section according to the comparative example.

Figure 14:
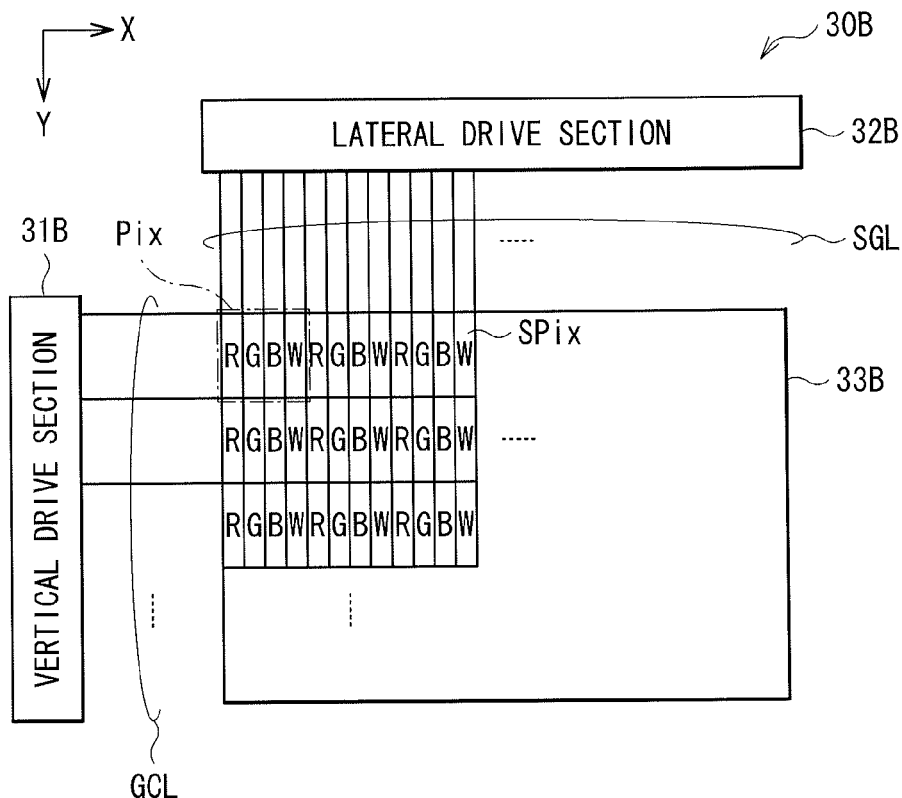

FIG. 14 is a block diagram of an exemplary configuration of an EL display section according to a modification of the first embodiment.

Figure 15:
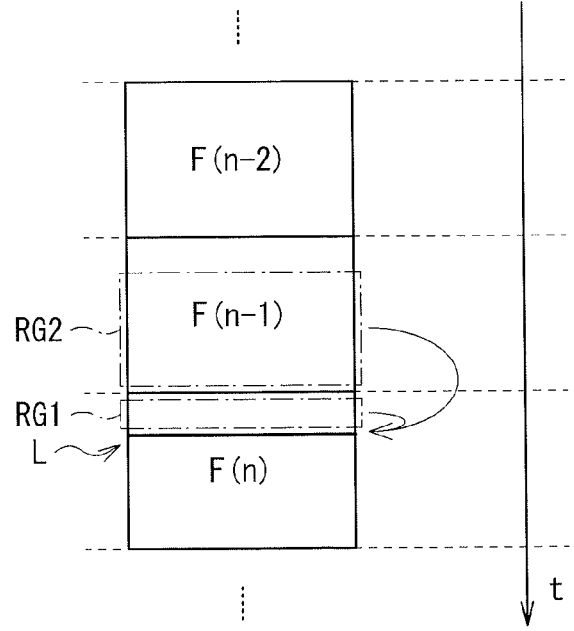

FIG. 15 is an explanatory view of an exemplary operation performed by a gain calculation section according to another modification of the first embodiment.

Figure 16:
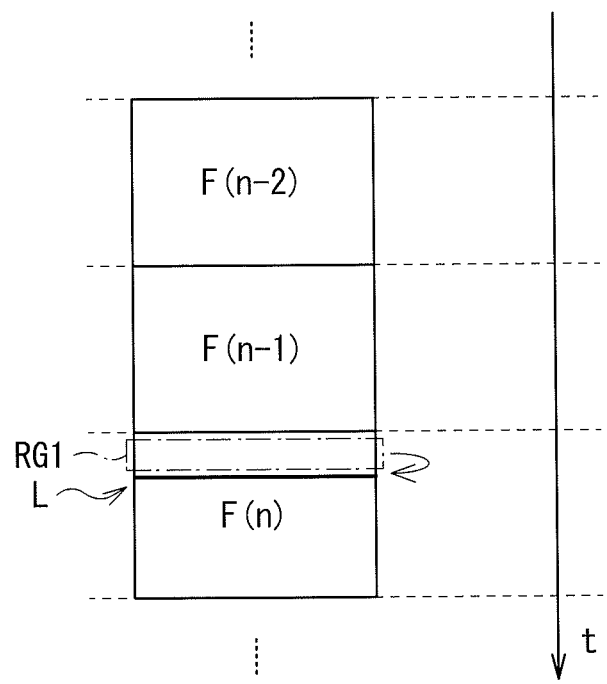

FIG. 16 is an explanatory view of an exemplary operation performed by a gain calculation section according to still another modification of the first embodiment.

Figure 17:
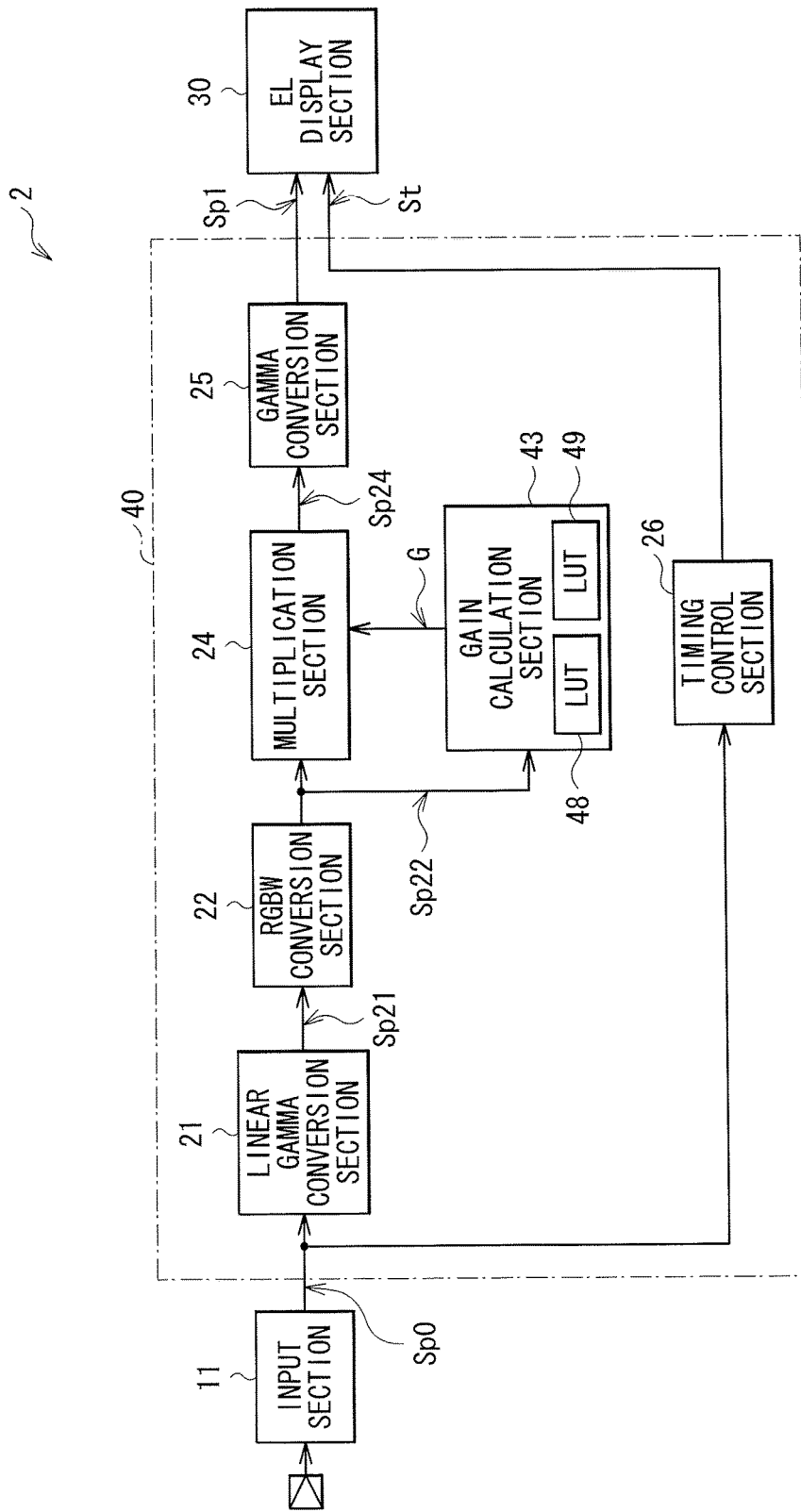

FIG. 17 is a block diagram of an exemplary configuration of a display device according to a second embodiment of the present disclosure.

Figure 18:
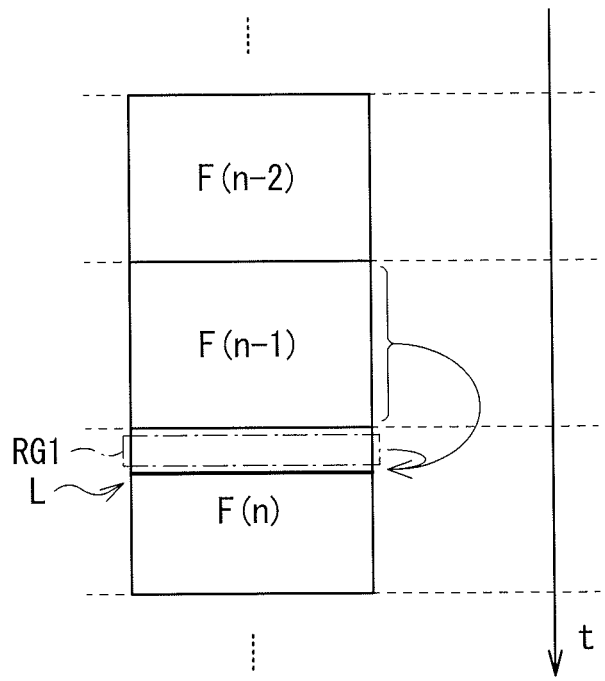

FIG. 18 is an explanatory view of an exemplary operation performed by a gain calculation section of FIG. 17.

Figure 19:
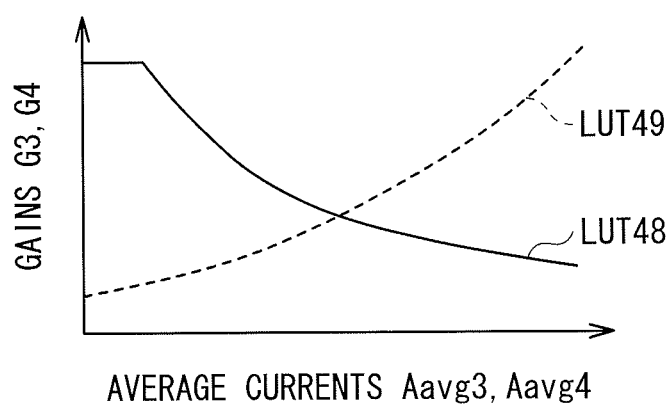

FIG. 19 is a diagram depicting an exemplary property of a LUT of FIG. 17.

Figure 20:
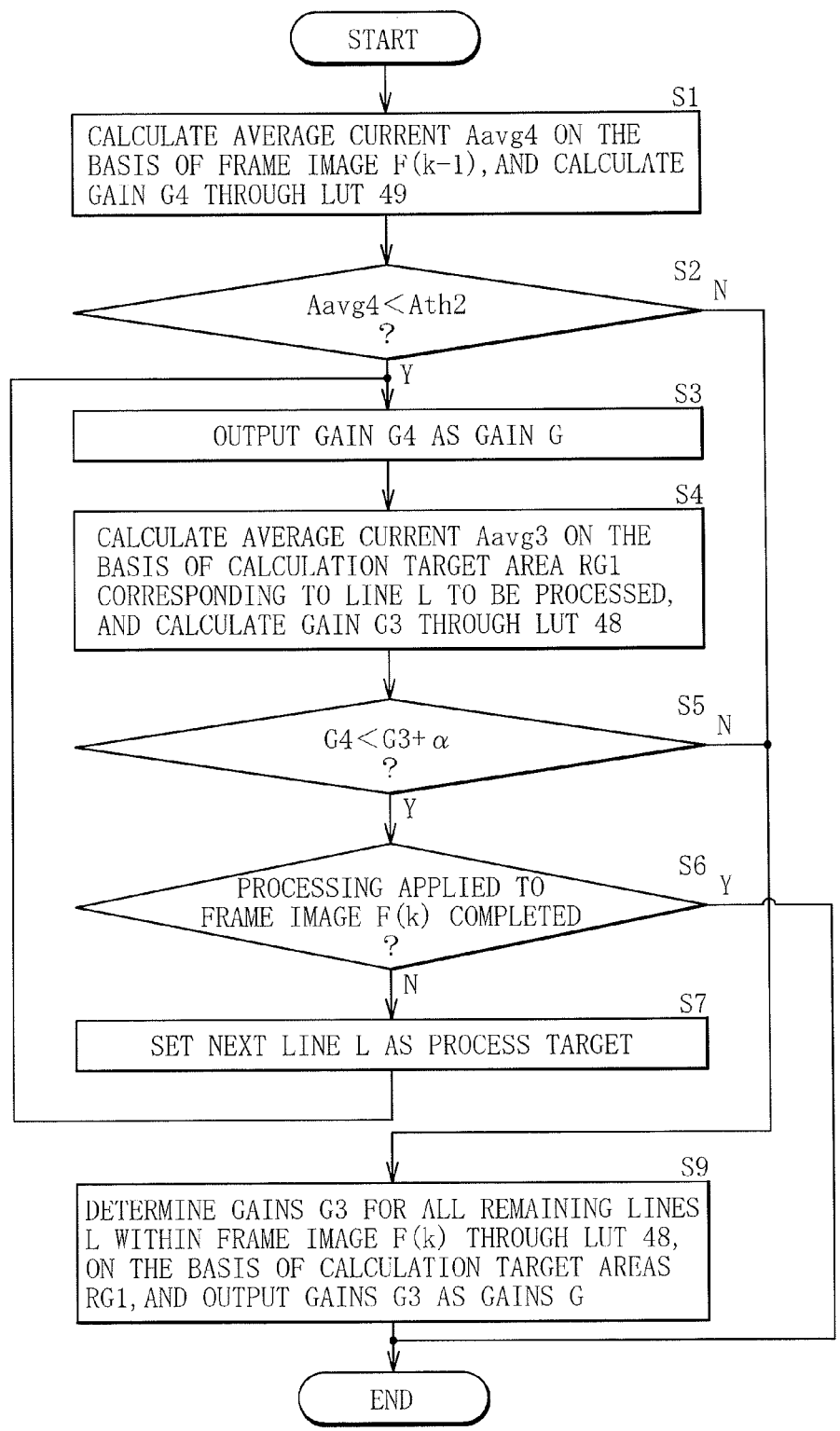

FIG. 20 is a flowchart of the exemplary operation performed by the gain calculation section of FIG. 17.

Figure 21:
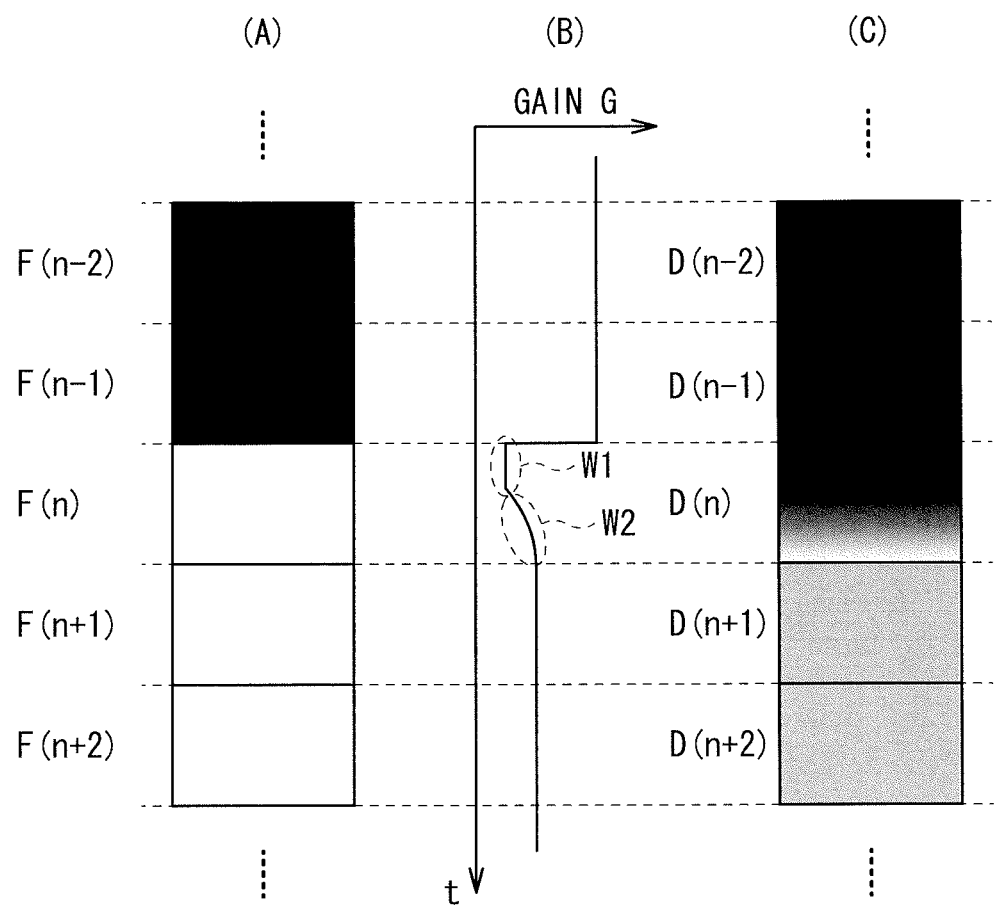

Parts (A), (B), and (C) of FIG. 21 are explanatory views of an exemplary operation performed by the display device of FIG. 17.

Figure 22:
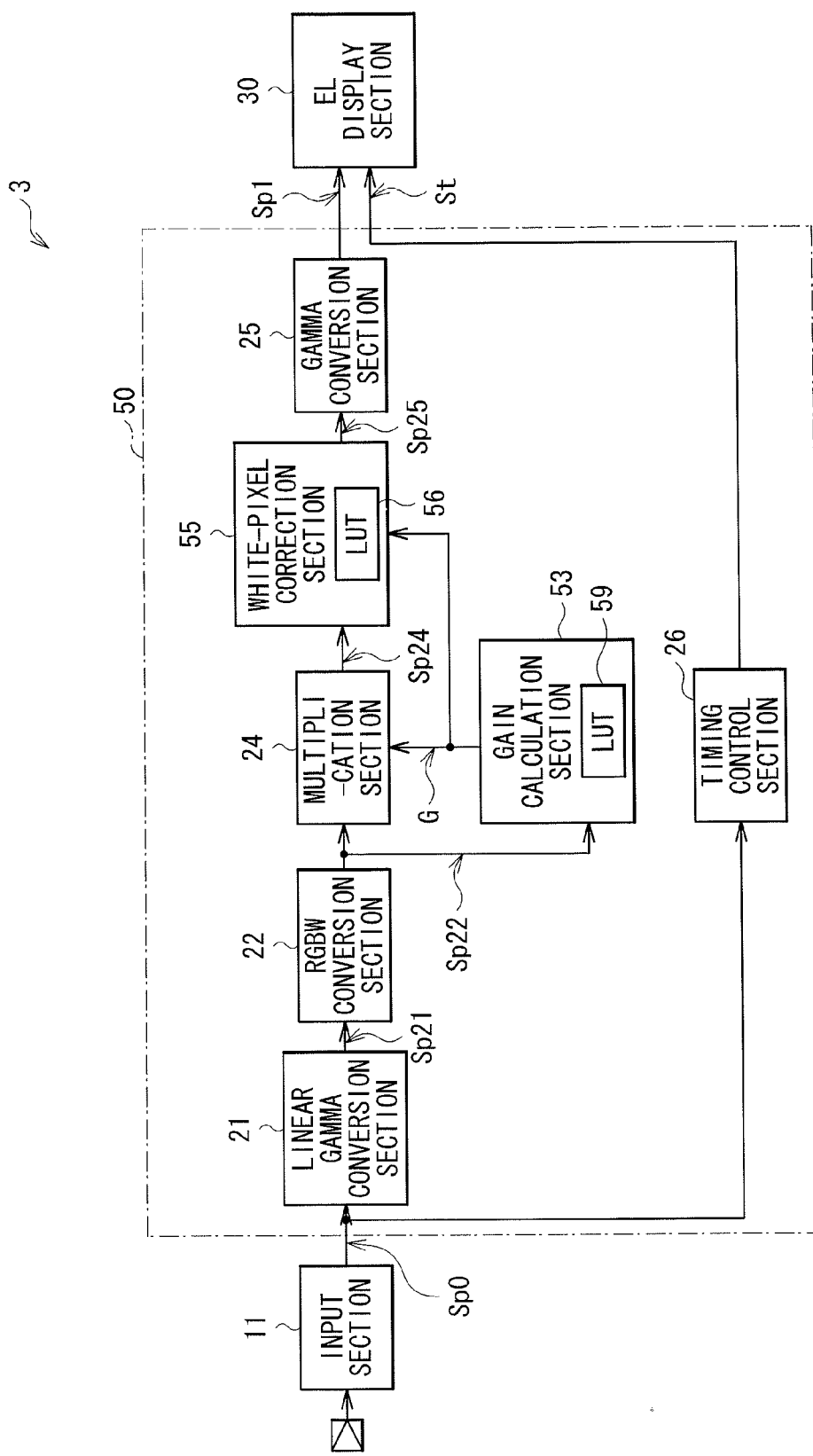

FIG. 22 is a block diagram of an exemplary configuration of a display device according to a third embodiment of the present disclosure.

Figure 23:
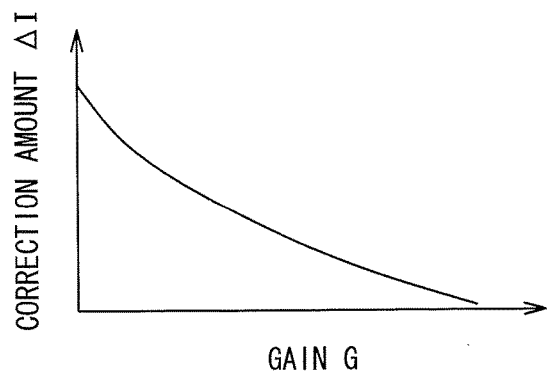

FIG. 23 is a diagram depicting an exemplary property of a LUT in a white-pixel correction section of FIG. 22.

Figure 24:
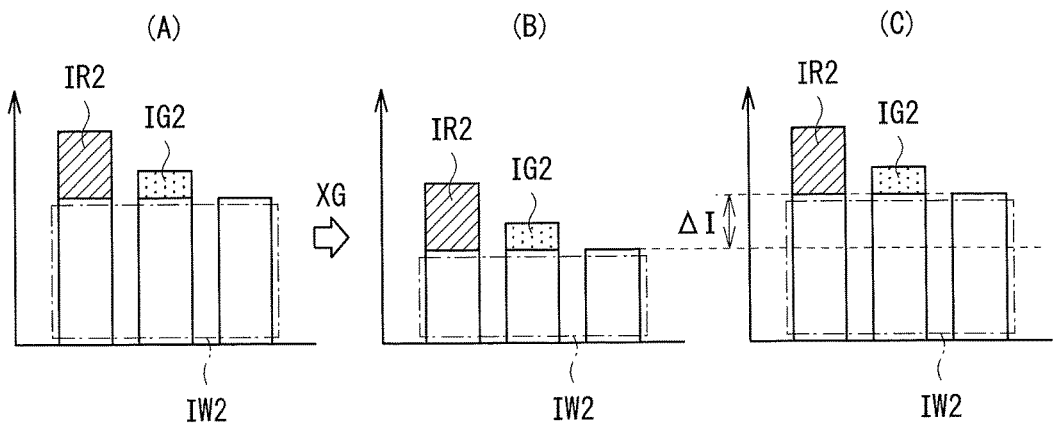

Parts (A), (B), and (C) of FIG. 24 are explanatory views of an exemplary operation performed by the display device of FIG. 22.

Figure 25:
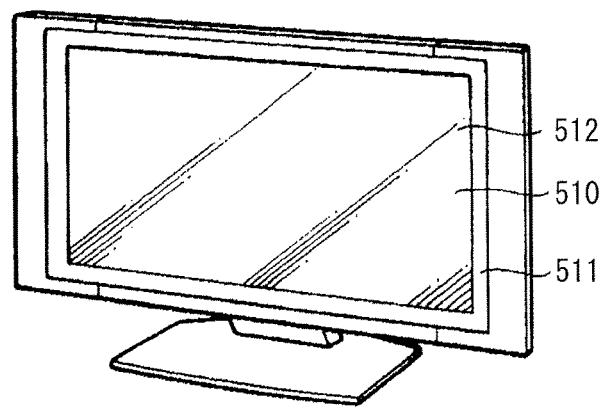

FIG. 25 is a schematic view illustrating an appearance structure of a TV unit including any of the display devices according to the embodiments.

Figure 26:
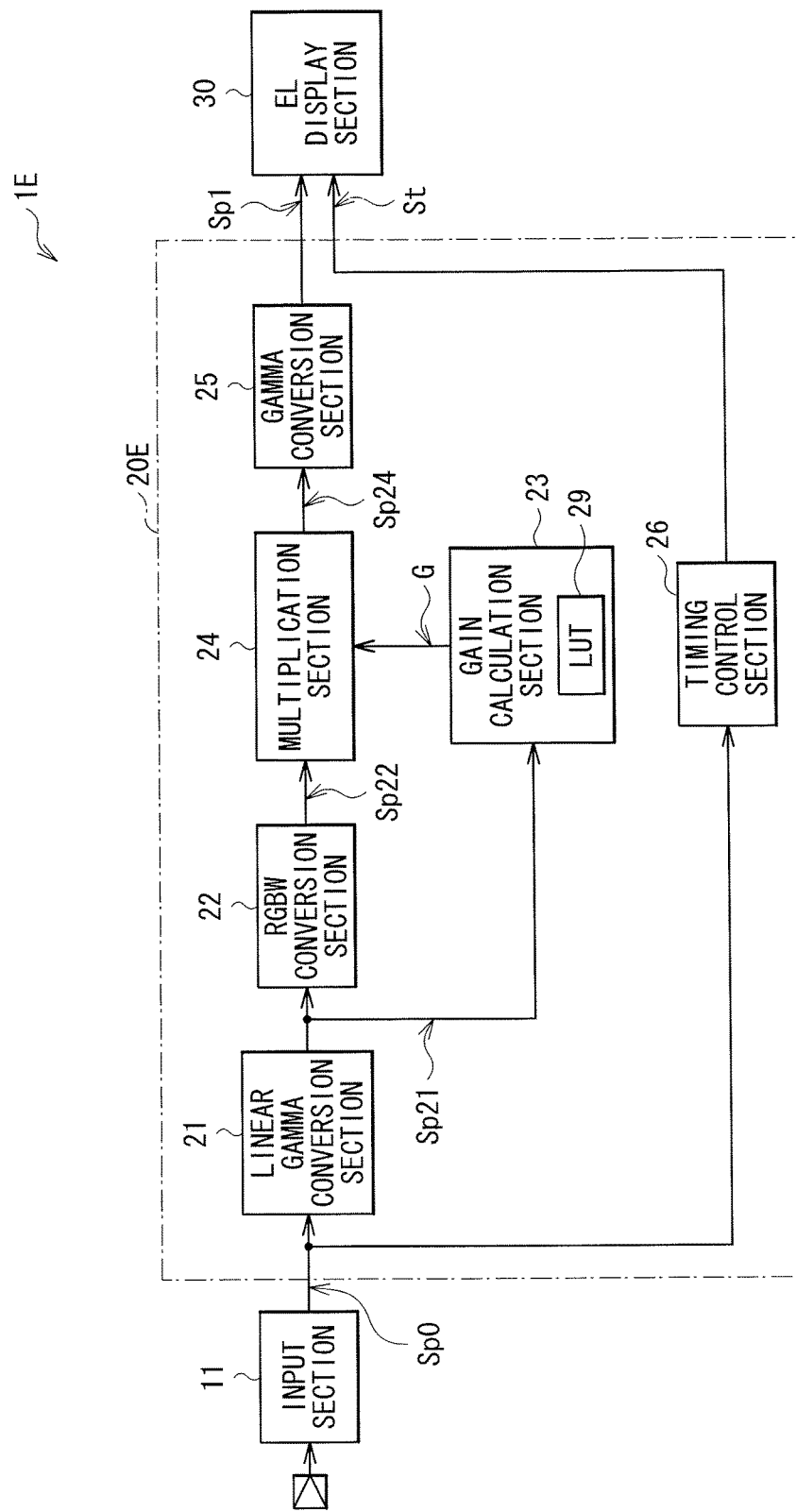

FIG. 26 is a block diagram of an exemplary configuration of a display device according to a modification.

Figure 27:
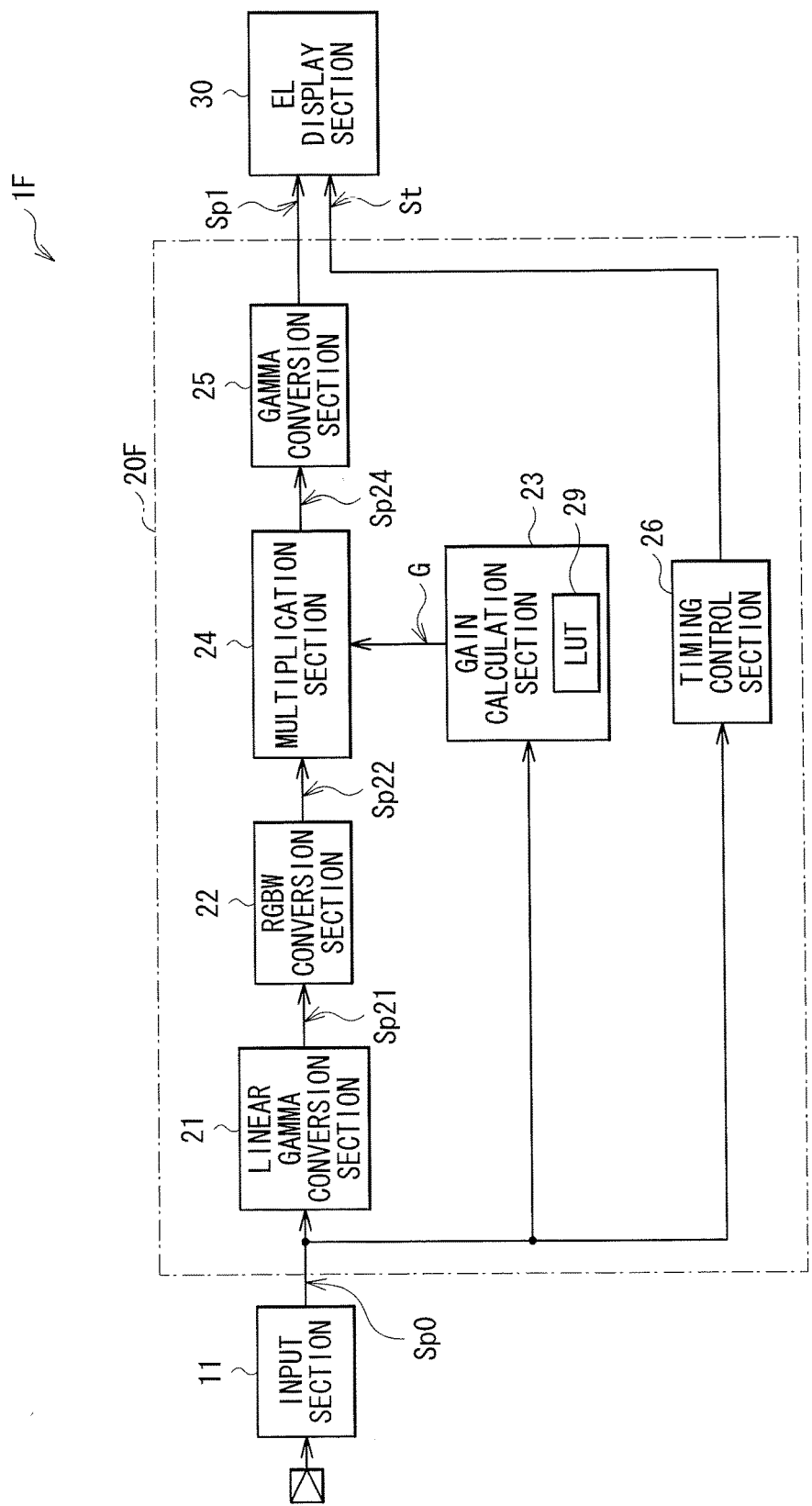

FIG. 27 is a block diagram of an exemplary configuration of a display device according to another modification.

Figure 28:
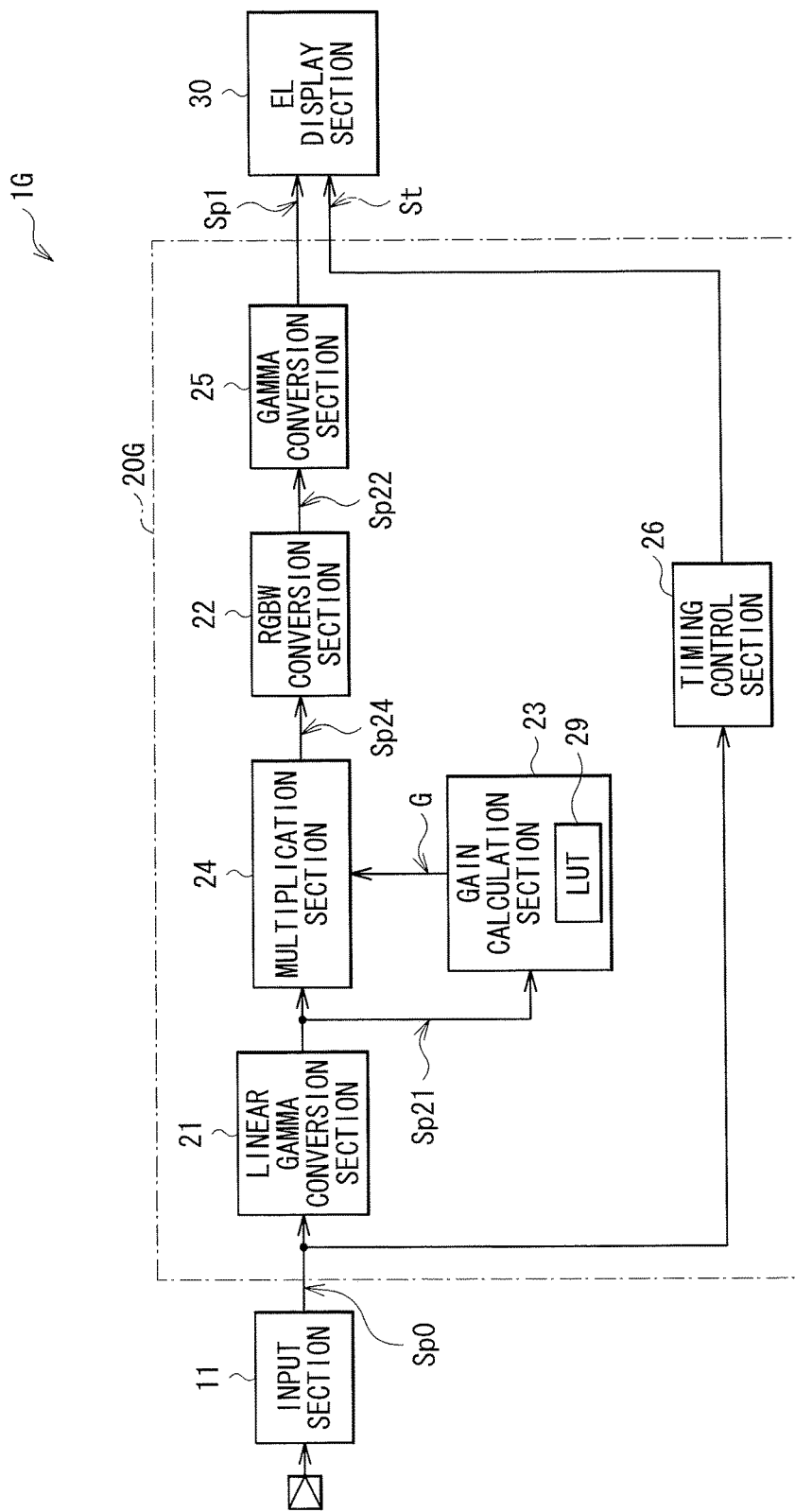

FIG. 28 is a block diagram of an exemplary configuration of a display device according to still another modification.

Figure 29:
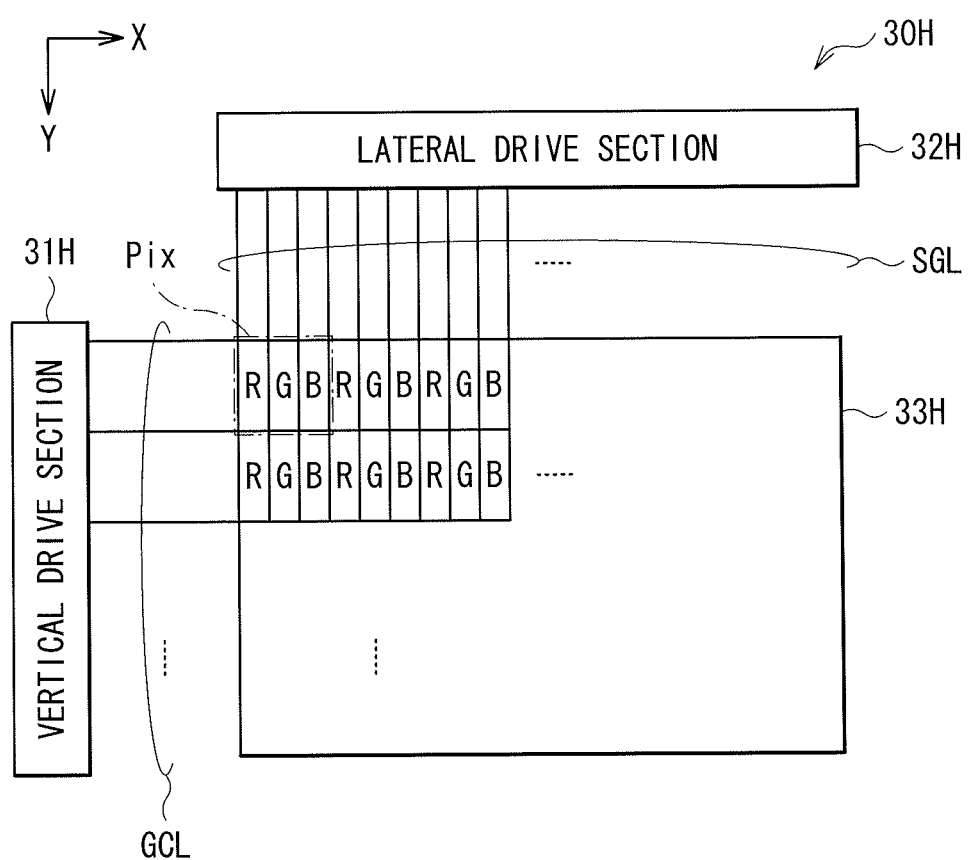

FIG. 29 is a block diagram of an exemplary configuration of an EL display section according to yet another modification.

DETAILED DESCRIPTION

Hereinafter, some embodiments of the present disclosure will be described in detail, with reference to the accompanying drawings. This description will be given in the following order.
1. First embodiment
2. Second embodiment
3. Third embodiment
4. Application examples
[1. First Embodiment]
(Exemplary Configuration)
(Overall Exemplary Configuration)

FIG. 1 depicts an exemplary configuration of a display device according to a first embodiment. A display device 1 is an EL display device that includes an organic EL display element as a display element. Note that an image processing device and an image processing method according to embodiments of the present disclosure are embodied by this embodiment, and therefore a description thereof will also be given collectively. The display device 1 includes an input section 11, an image processing section 20, and an EL display section 30.

The input section 11 serves as an input interface, and generates an image signal Sp0, on the basis of an image signal supplied from an external apparatus. In this example, the image signal supplied to the display device 1 contains red (R) luminance information IR, green (G) luminance information IG, and blue (B) luminance information IB. In other words, the image signal is a so-called RGB signal.

The image processing section 20 generates an image signal Sp1 and a timing control signal St by subjecting the image signal Sp0 to a predetermined image process, such as an automatically brightness limit (ABL) process as will be described later.

The EL display section 30 is a display section that includes an organic electro-luminescence (EL) display element as a display element, and performs a display operation, on the basis of the image signal Sp1 and the timing control signal St.

Figure 2:
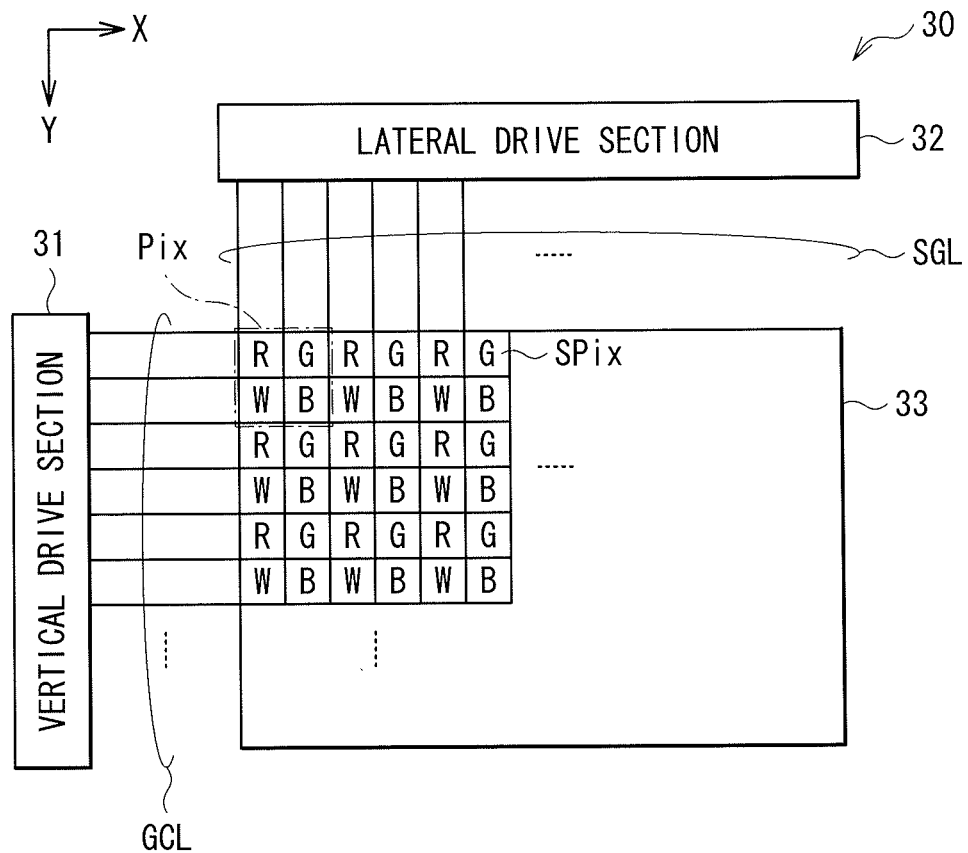
FIG. 2 is a block diagram of an exemplary configuration of an EL display section of FIG. 1.

FIG. 2 depicts an exemplary configuration of the EL display section 30. The EL display section 30 includes a pixel array section 33, a vertical drive section 31, and a lateral drive section 32.

The pixel array section 33 has a configuration in which pixels Pix are arranged in a matrix fashion. In this example, each pixel Pix includes four sub-pixels SPix, or red (R), green (G), blue (B), and white (W) sub-pixels SPix. In the example, the four sub-pixels SPix of each pixel Pix are arranged in two rows and two columns. In more detail, in each pixel Pix, the red (R), green (G), white (W), and blue (B) sub-pixels SPix are arranged at the upper left, upper right, lower left, and lower right locations, respectively.

The vertical drive section 31 generates scan signals, on the basis of the timing control signal St supplied from the image processing section 20, and sequentially selects the sub-pixels SPix in the pixel array section 33 for each line by supplying the timing control signals St to the pixel array section 33 through gate lines GCL, thereby performing line sequential scanning. The lateral drive section 32 generates pixel signals, on the basis of the image signal Sp1 and the timing control signal St, and supplies the pixel signals to the pixel array section 33 through data lines SGL, thereby supplying these pixel signals to the individual sub-pixels SPix in the pixel array section 33.

Figure 3:
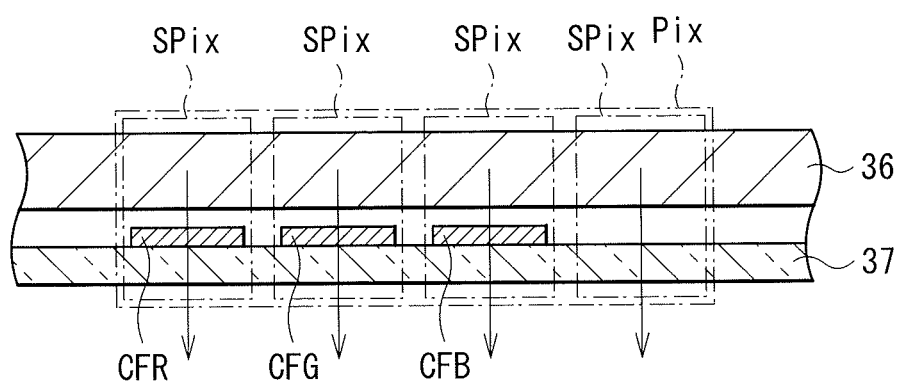
FIG. 3 is a view illustrating a general cross-section configuration of the EL display section of FIG. 1.

FIG. 3 depicts a cross-section configuration of main part of the EL display section 30. The EL display section 30 includes an EL layer 36, and color filters CFR, CFG, and CFB. In this example, the sub-pixels SPix of the EL layer 36 are configured to emit while light fluxes independently of one another. The color filters CFR, CFG, and CFB are filters that allow red (R) light, green (G) light, and blue (B) light to pass therethrough, respectively, and are formed on a transparent substrate 37 provided opposite the EL layer 36. In FIG. 2, the red (R), green (G), and blue (B) sub-pixels SPix are provided with the color filters CFR, CFG, and CFB, respectively. Meanwhile, the white (W) sub-pixel SPix is configured without a color filter. This configuration enables the red, green, blue, and white sub-pixels SPix to emit light fluxes of corresponding colors.

(Image Processing Section 20)

The image processing section 20 performs an image process, such as the ABL process as will be described later. This ABL process decreases the power consumption of the pixel array section 33. For example, when the pixel array section 33 displays a complementary color (such as cyan, yellow or magenta) by using two colors out of the red (R), green (G), and blue (B), the pixel array section 33 has to cause two corresponding sub-pixels SPix to emit light. In such a case, the power consumption of the pixel array section 33 is prone to being increased. Therefore, the image processing section 20 calculates an average current Aavg of the pixel array section 33, and adjusts the luminance of the pixel array section 33 in accordance with the average current Aavg. Hereinafter, the image processing section 20 will be described in detail.

The image processing section 20 includes a linear gamma conversion section 21, an RGBW conversion section 22, a gain calculation section 23, a multiplication section 24, a gamma conversion section 25, and a timing control section 26.

The linear gamma conversion section 21 converts the received image signal Sp0 into an image signal Sp21 having a linear gamma property. In general, in the image signal supplied from an external source, the gamma value is set to, for example, 2.2 so as to match the property of a typical display device, and therefore the image signal has a nonlinear gamma property. The linear gamma conversion section 21 converts this nonlinear gamma property into a linear gamma property, in order to facilitate the process performed by the image processing section 20.

The RGBW conversion section 22 generates an RGBW signal, on the basis of the RGB signal, or the image signal Sp21, and outputs the RGBW signal as an image signal Sp22. Specifically, the RGBW conversion section 22 converts the RGB signal into the RGBW signal. Here, the RGB signal contains three pieces of luminance information, namely, red luminance information IR, green luminance information IG, and blue luminance information IB. Meanwhile, the RGBW signal contains four pieces of luminance information, namely, red (R) luminance information IR2, green (G) luminance information IG2, blue (B) luminance information IB2, and white (W) luminance information IW2.

Left and right parts of FIG. 4 schematically depict an exemplary operation performed by the RGBW conversion section 22. First, the RGBW conversion section 22 determines luminance information IW2, on the basis of the minimum (the luminance information IB in this example) among the received red luminance information IR, green luminance information IG, and blue luminance information IB. Then, the RGBW conversion section 22 determines the red (R) luminance information IR2, the green (G) luminance information IG2, and the blue (B) luminance information IB2, on the basis of the pieces of the luminance information IR, IG, and IB, respectively.

Concretely, the RGBW conversion section 22 determines the pieces of luminance information IR2, IG2, IB2, and IW2, on the basis of the following expressions $$IR2=IR-\text{Min}(IR,IG,IB) \times Cw \qquad (1)$$

$$IG2=IG-\text{Min}(IR,IG,IB) \times Cw \qquad (2)$$

$$IB2=IB-\text{Min}(IR,IG,IB) \times Cw \qquad (3)$$

$$IW2=\text{Min}(IR,IG,IB) \times Cw \times Lw \qquad (4)$$

where: Min (IR, IG, IB) denotes the minimum among the pieces of luminance information IR, IG, and IB; Cw denotes a constant (0≤Cw≤1); and Lw denotes a parameter that represents a ratio of the sum of the respective maximum luminances of the red, green, and blue sub-pixels SPix to the maximum luminance of the white sub-pixel SPix.

The RGBW conversion section 22 determines the pieces of luminance information IR2, IG2, IB2, and IW2, on the basis of the above expressions, and outputs the RGBW signal containing the pieces of luminance information IR2, IG2, IB2, and IW2 as the image signal Sp22.

The gain calculation section 23 calculates a gain G to be used for the ABL process, on the basis of the image signal Sp22 (or the RGBW signal). The gain calculation section 23 calculates the average current Aavg for all the pixels Pix in the pixel array section 33, on the basis of the image signal Sp22. In addition, the gain calculation section 23 calculates the gain G for each line, on the basis of the average current Aavg. The gain calculation section 23 contains a look up table (LUT) 29 that stores a relationship between the average current Aavg and the gain G. The gain calculation section 23 converts the average currents Aavg into the gains G through the LUT 29, as will be described later.

The multiplication section 24 individually multiplies the pieces of luminance information IR2, IG2, IB2, and IW2 contained in the image signal Sp22 by the gain G calculated by the gain calculation section 23. Then, the multiplication section 24 outputs this result as an image signal Sp24.

FIG. 5 depicts a gain calculation operation performed by the gain calculation section 23. Specifically, FIG. 5 depicts a process applied to a series of received frame images F. For example, F(n−1) denotes a (n−1)th frame image F, and F(n) denotes a (n)th frame image F.

It is assumed that the gain calculation section 23 calculates the gain G, which is to be multiplied by a line L in the multiplication section 24. In this case, the gain calculation section 23 calculates the average current Aavg, on the basis of the pieces of luminance information IR2, IG2, IB2, and IW2 regarding an image area (calculation target area RG). The above calculation target area RG precedes the line L, and is equivalent to an area of a single frame image. In more detail, for example, it is assumed that the gain calculation section 23 calculates the gain G which is to be multiplied by a 300th line L within the frame image F(n) in the multiplication section 24. In this case, the gain calculation section 23 calculates the average current Aavg for the calculation target area RG that spans between a 300th line within the frame image F(n−1) preceding the frame image F(n) and a 299th line within the frame image F(n).

When the gain calculation section 23 calculates the average current Aavg, it first determines a pixel current Apix for each pixel Pix within the calculation target area RG through the following expression $$Apix=IR2 \times KR+IG2 \times KG+IB2 \times KB+IW2 \times KW \qquad (5)$$

where KR, KG, KB, and KW denote current ratio coefficients by which the pieces of luminance information IR2, IG2, IB2, and IW2 are converted into corresponding currents. Then, the gain calculation section 23 calculates the average current Aavg by determining an average of pixel currents Apix flowing in all the pixels Pix within the calculation target area RG.

Followed by, the gain calculation section 23 converts the above average current Aavg into the gain G through the LUT 29.

FIG. 6 depicts a relationship between the average current Aavg and the gain G in the LUT 29. In this example, when the average current Aavg is equal to or smaller than a predetermined current Ath, the gain G becomes 1. Meanwhile, as the average current Aavg is increasing from the predetermined current Ath, the gain G is gradually decreasing from 1.

In the above way, the gain calculation section 23 determines the average current Aavg of the calculation target area RG for each line L, and calculates the gain G. Then, the multiplication section 24 individually multiplies the gain G by the pieces of luminance information IR2, IG2, IB2, and IW2 related to the line L. When the gain calculation section 23 processes the next line L, it shifts the calculation target area RG by one line. Then, the gain calculation section 23 determines the average current Aavg of the shifted calculation target area RG, and determines the gain G. Moreover, the multiplication section 24 performs the multiplication process in the above manner.

The gamma conversion section 25 converts the image signal Sp24 having the linear gamma property into the image signal Sp1 having the nonlinear gamma property corresponding to the property of the EL display section 30.

The timing control section 26 generates the timing control signal St, on the basis of the image signal Sp0, and supplies the timing control signal St to the EL display section 30.

Herein, the multiplication section 24 corresponds to a concrete example of a "correction section" according to an embodiment of the present disclosure. The frame image F(n) corresponds to a concrete example of a "first frame image" according to an embodiment of the present disclosure. The frame image F(n−1) corresponds to a concrete example of a "second frame image" according to an embodiment of the present disclosure. The pieces of luminance information IR2, IG2, IB2, and IW2 correspond to a concrete example of "pixel luminance information" according to an embodiment of the present disclosure.

(Operation and Effect)

Next, a description will be given of an operation and effect of the display device 1 according to this embodiment.

(Outline of Overall Operation)

First, a description will be given of an outline of an overall operation performed by the display device 1, with reference to FIG. 1 and some other drawings. The input section 11 generates the image signal Sp0, on the basis of the image signal supplied from an external apparatus. The linear gamma conversion section 21 converts the received image signal Sp0 into the image signal Sp21 having the linear gamma property. The RGBW conversion section 22 generates the RGBW signal, on the basis of the RGB signal, or the image signal Sp21, and outputs the RGBW signal as the image signal Sp22. The gain calculation section 23 calculates the gain G for each line L, on the basis of the image signal Sp22. The multiplication section 24 individually multiplies the gain G by the pieces of luminance information IR2, IG2, IB2, and IW2 related to the line L which are contained in the image signal Sp22. Then, the multiplication section 24 outputs the multiplication result as the image signal Sp24. The gamma conversion section 25 converts the image signal Sp24 having the linear gamma property into the image signal Sp1 having the nonlinear gamma property corresponding to the property of the EL display section 30. The timing control section 26 generates the timing control signal St, on the basis of the image signal Sp0. The EL display section 30 performs a display operation, on the basis of the image signal Sp1 and the timing control signal St.

(Detailed Operation)

FIG. 7 depicts the line sequential scanning performed by the display device 1. In FIG. 7, a vertical axis represents a scan location in the EL display section 30 in a sequential scan direction. For example, "F(n)" denotes that the EL display section 30 performs the display operation based on the frame image F(n), and "OFF" denotes that the EL display section 30 is in a light non-emitting state.

As illustrated in FIG. 7, the display device 1 performs line sequential scanning in a direction from an uppermost part to a lowermost part during each frame period, on the basis of each frame image F. Light-emitting periods P3 and light-out periods P4 alternately and repeatedly appear on each line L. The pixel signals are written during a writing period P1 within the light-out period P4, whereas initialization and correction operations are performed during a preparation period P2 within the light-out period P4. Furthermore, the pixels Pix corresponding to the line L emit light during the light-emitting period P3. After that, the display device 1 causes the pixels Pix to stop emitting the light, and performs a writing operation of the pixel signal for next light emission and the initialization operation.

Next, a description will be given of the ABL process performed by the display device 1. The display device 1 performs this ABL process, in order to control the display luminance of the screen in such a way that it does not excessively increases. With the ABL process, the power consumption of the display device 1 is decreased.

Parts (A) to (C) of FIG. 8 depict an exemplary operation performed by the display device 1 during the ABL process. In more detail, Part (A) depicts frame images F entered in the display device 1, Part (B) depicts the gain G, and Part (C) depicts display images provided by the EL display section 30. FIG. 9 depicts the gain G in the individual states of FIG. 8. In this example, as depicted in Part (A) of FIG. 8, two black images (or frame images F(n−2) and F(n−1)) and three white images (or frame images F(n), F(n+1), and F(n+2)) are supplied to the display device 1, in this order. Here, display images D correspond to the frame images F. For example, the display image D(n) is an image displayed as a result of an image process applied to the frame image F(n).

When the series of frame images F are supplied to the display device 1, the gain calculation section 23 calculates the gain G for each line L, on the basis of the pieces of luminance information IR2, IG2, IB2, and IW2 (image data) regarding the calculation target area RG that precedes each line L. Then, the multiplication section 24 individually multiplies the gain G by the pieces of luminance information IR2, IG2, IB2, and IW2 related to each line L. The EL display section 30 displays the images that have been processed in this manner, as the display images D. Hereinafter, this operation will be described in detail by giving processes applied to lines L11 to L14 as examples.

When the pieces of luminance information IR2, IG2, IB2, and IW2 regarding a line L11 within the frame image F(n−1) (see Part (A) of FIG. 8) are supplied, the gain calculation section 23 determines a gain G11, on the basis of image data of the calculation target area RG that precedes the line L11. Since both the frame image F(n−1) and the preceding frame image F(n−2) are black images, image data of the calculation target area RG entirely indicate black. In this case, the average current Aavg of the calculation target area RG becomes sufficiently low, and the gain G11 becomes "1" as depicted in FIG. 9. Consequently, black display is created on the line L11 (see Part (C) of FIG. 8).

Furthermore, when the pieces of luminance information IR2, IG2, IB2, and IW2 regarding a line L12 within the frame image F(n) (see Part (A) of FIG. 8) are supplied, the gain calculation section 23 similarly determines a gain G12, on the basis of image data of the calculation target area RG that precedes the line L12. Since the frame image F(n) and the preceding frame image F(n−1) are a white image and a black image, respectively, the gain G12 becomes "1" as depicted in FIG. 9. This is because the average current Aavg of the calculation target area RG is larger than that of the above line L11, but is still smaller than the predetermined current Ath. Consequently, white display is created on the line L12 (see Part (C) of FIG. 8).

After that, when the pieces of luminance information IR2, IG2, IB2, and IW2 regarding a line L13 within the frame image F(n)(see Part (A) of FIG. 8) are supplied, the gain calculation section 23 similarly determines a gain G13, on the basis of image data of the calculation target area RG that precedes the line L13. In this case, the calculation target area RG contains a larger proportion of a white image than that preceding the line L12, as described above, does. Accordingly, the average current Aavg of the calculation target area RG becomes higher to exceed the predetermined current Ath, so that the gain G13 becomes lower than 1, as depicted in FIG. 9. Consequently, display in which the luminance is slightly suppressed is created on the line L13, (see Part (C) of FIG. 8).

Moreover, the pieces of luminance information IR2, IG2, IB2, and IW2 regarding a line L14 within the frame image F(n+1) (see Part (A) of FIG. 8) are supplied, the gain calculation section 23 similarly determines a gain G14, on the basis of image data of the calculation target area RG that precedes the line L14. Since both the frame image F(n+1) and the preceding frame image F(n) are white images, the average current Aavg of the calculation target area RG becomes sufficiently high, and therefore the gain G14 becomes lower, as depicted in FIG. 9. Consequently, display in which the luminance is suppressed even more is created on the line L14 (see Part (C) of FIG. 8).

As described above, the display device 1 determines the gain G, on the basis of the image data of the calculation target area RG that precedes the line L to be processed. Therefore, the ABL process is performed in a shorter response time than a comparative example which will be described later.

Parts (A) to (C) of FIG. 10 depict an operation performed by the display device 1 when the series of frame images F are supplied to the display device 1 as described in FIG. 8. In more detail, Part (A) depicts the line sequential scanning, Part (B) depicts the gain G, and Part (C) depicts the average current Aavg of the pixel array section 33.

The line sequential scanning applied to the frame image F(n) (white image) starts. When the light-emitting periods P3 successively start on the respective lines L from a timing t1, the average current Aavg gradually increases, as described in Part (C) of FIG. 10. Then, the average current Aavg is kept substantially constant from a timing t2 at which the light-emitting period P3 for an uppermost line of the EL display section 30 ends.

The current based on the frame image F(n) decreases from a timing t3 at which the light-emitting period P3 for a lowermost line of the EL display section 30 starts. However, the line sequential scanning applied to the next frame image F(n+1) (white image) starts at the timing t3. Accordingly, a current based on the frame image F(n+1) increases. Consequently, the average current Aavg is kept substantially constant even after the timing t3.

The gain G gradually decreases over a period from the timing t1 to the timing t3 (see Part (B) of FIG. 10), as described with reference to FIGS. 8 and 9. Therefore, an increase in the average current Aavg over the period from the timing t1 to the timing t3 is suppressed as compared with the comparative example which will be described later. Consequently, the average current Aavg, or the current consumption, is decreased.

COMPARATIVE EXAMPLE

Next, a description will be given of an effect provided by this embodiment, in comparison with the comparative example. This comparative example constitutes a display device 1R including a gain calculation section 23R that determines the gain G, on the basis of the preceding frame image F. Other configurations of the comparative example are substantially the same as those of this embodiment (see FIG. 1).

FIG. 11 depicts an operation in which the gain calculation section 23R according to this comparative example calculates the average current Aavg. When the gain calculation section 23R calculates the gain G which is to be multiplied by the line L in the multiplication section 24, it calculates the average current Aavg, on the basis of the pieces of luminance information IR2, IG2, IB2, and IW2 regarding the frame image F(n−1) that precedes the frame image F containing the line L. Then, the gain calculation section 23R determines the gain G, on the basis of the average current Aavg. Specifically, the gain calculation section 23R calculates the gain G for each frame image F. Furthermore, the multiplication section 24 individually multiplies the gain G by all the pieces of luminance information IR2, IG2, IB2, and IW2 regarding the frame image F(n).

Parts (A) to (C) of FIG. 12 depict an exemplary operation performed by the display device 1R during the ABL process. In more detail, Part (A) depicts the frame images F entered in the display device 1R, Part (B) depicts the gain G, and Part (C) depicts the display images D provided by the EL display section 30.

To give an example, as for a gain G15R for a line L15R within the frame image F(n−1), it becomes "1." This is because the preceding frame image F(n−2) is a black image, and the average current Aavg becomes sufficiently low. Consequently, black display is created on the line L15R (Part (C) of FIG. 12).

To give another example, as for a gain G16R for a line L16R within the frame image F(n), it becomes "1." This is because the preceding frame image F(n−1) is a black image, and the average current Aavg becomes sufficiently low. Consequently, white display is created on the line L16R (Part (C) of FIG. 12).

To give still another example, as for a gain G17R for a line L17R within the frame image F(n+1), it becomes sufficiently low. This is because the preceding frame image F(n) is a white image, and the average current Aavg becomes sufficiently high. Consequently, display in which the luminance is suppressed is created on the line L17R (Part (C) of FIG. 12).

As described above, the display device 1R determines the gain G, on the basis of the preceding frame image F. Accordingly, throughout every frame image F, the gain G is uniform independently of the lines L, as depicted in Part (B) of FIG. 12. Thus, in the case where the supplied image is changed from a black image to a white image, a single image with high luminance (display image D(n)) may be displayed, as depicted in Part (C) of FIG. 12.

Parts (A) to (C) of FIG. 13 depict an operation performed by the display device 1R when a series of frame images F, as described above, are supplied to the display device 1R. In more detail, Part (A) depicts the line sequential scanning, Part (B) depicts the gain G, and Part (C) depicts the average current Aavg of the pixel array section 33.

The line sequential scanning applied to the frame image F(n)(white image) starts, and when the light-emitting periods P3 successively starts on the corresponding lines L from the timing t1, the average current Aavg gradually increases, as depicted in Part (C) of FIG. 10. In this case, the average current Aavg further increases, as opposed to this embodiment (see FIG. 10), because the gain G is kept at approximately "1." Then, this high average current Aavg is kept substantially constant from the timing t2. Moreover, with the decrease in the gain G, the average current Aavg becomes substantially the same as that of this embodiment (Part (C) of FIG. 10), at the timing t3, and is kept constant from the timing t3, as depicted in Part (B) of FIG. 13. Thus, in the display device 1R, the average current Aavg may transiently increase (for example, within the period from the timing t2 to the timing t3).

As described above, the display device 1R according to the comparative example determines the gain G, on the basis of the preceding frame image F. Accordingly, the response of the display device 1R to the change in the frame image F may be delayed. In this case, the white image would be transiently displayed, as depicted in FIG. 12. Thus, the display device 1R may have a risk of lowering the image quality.

As described above, since it is difficult for the display device 1R to respond to the change in the frame image F quickly, the average current Aavg may transiently increase, as depicted in FIG. 13. In order to avoid such a disadvantage, a power supply device equipped with a high current-supply capacity which is capable of supplying a large current is necessary. In many cases, such a power supply device consumes a large current by itself, and is large in size. If the power supply device consumes a large current, it may negate a feature of an organic EL display device which is its low power consumption. Furthermore, the power supply device is large in size, the display device may also be enlarged. In this case, another feature of an organic EL display device which is its small footprint may be negated. Moreover, the design flexibility of an organic EL display device may be decreased, thereby lowering the product competitiveness.

A method of installing a frame memory is conceivable as a method of reducing the risk that the average current Aavg transiently increases, as described above. Specifically, a method is conceivable, in which: data of each frame image is temporally stored in a frame memory; the gain G is determined on the basis of the data; and each frame image is processed by using the gain G and is displayed. However, employing this method may cause the timing of the display image to be delayed. For example, in the case where the above method is applied to a game in which the image is changed quickly, the timing of the display image may fail to follow a user's operation promptly. As a result, the operability of the game would be deteriorated.

In contrast, the display device 1 according to this embodiment determines the gain G, on the basis of image data within the calculation target area RG that precedes the line L. This configuration increases the speed of the response to the change in the frame image F. Thus, it is possible to reduce the risk of transiently displaying the white image as depicted in FIG. 8, thereby reducing the risk of lowering the image quality.

The quick response to the change in the frame image F, as described above, also reduces the risk of transiently increasing the average current Aavg, as depicted in FIG. 10. This makes it possible to lessen the current-supply capacity requested for the power supply device, thus decreasing the current consumption of the display device 1 and increasing the design flexibility thereof. In addition, the installation of a frame memory becomes unnecessary, thus reducing a risk of causing a viewer to perceive any unnatural feeling even in game applications or the like.

[Effect]

In this embodiment, as described above, the gain is determined on the basis of image data within a calculation target area that precedes a line to be processed. Therefore, it is possible to decrease the current consumption and increase the design flexibility.

(Modification 1-1)

In the above first embodiment, the pixel array section 33 of the EL display section 30 has the pixels Pix, each of which is provided with the four sub-pixels SPix arranged in the two rows and the two columns. However, there is no limitation on the arrangement of the sub-pixels SPix. Alternatively, each pixel Pix may be configured by aligning the four sub-pixels SPix so as to extend in a vertical direction Y and arranging these aligned sub-pixels SPix side by side in a lateral direction X, for example, as illustrated in FIG. 14. In this example, red (R), green (G), blue (B), and white (W) sub-pixels SPix are arranged in each pixel Pix, in this order from the left.

(Modification 1-2)

In the above first embodiment, the average current Aavg is determined on the basis of all the pieces of luminance information IR2, IG2, IB2, and IW2 regarding the calculation target area RG that precedes the line L. However, there is no limitation on the method of determining the average current Aavg. Alternatively, the average current Aavg may be determined on the basis of the fewer pieces of luminance information IR2, IG2, IB2, and IW2, which are obtained by thinning out all pieces of luminance information regarding the calculation target area RG. With this alternative method, the load of the computing process is lightened.

(Modification 1-3)

In the above first embodiment, the gain calculation section 23 determines the gain G, on the basis of the pieces of luminance information IR2, IG2, IB2, and IW2 regarding the image area (or the calculation target area RG) that precedes the line L and that is equivalent to an area of a single frame image. However, there is no limitation on the method of determining the gain G. Hereinafter, some examples of alternative methods will be described.

FIG. 15 depicts a gain calculation operation performed by a gain calculation section 23A according to this modification. It is assumed that the gain calculation section 23A calculates the gain G which is to be multiplied by the line L in the multiplication section 24. In this case, the gain calculation section 23A determines, in the image area (or the calculation target area RG) that precedes that line L and that is equivalent to an area of a single frame image, a gain G1 from part of the calculation target area RG which corresponds to the frame image F containing that line L. Also, the gain calculation section 23A determines a gain G2 from part of the calculation target area RG which is included in the preceding frame image F. In more detail, for example, it is assumed that the gain calculation section 23A calculates the gain G which is to be multiplied by a 300th line L within the frame image F(n). In this case, the gain calculation section 23A determines the gain G1, on the basis of a calculation target area RG1 spanning from a 1st line to a 299th line within the frame image F(n). Also, the gain calculation section 23A determines the gain G2, on the basis of a calculation target area RG2 spanning from a 300th line to a last line within the frame image F(n−1) which precedes the frame image F(n). Further, the gain calculation section 23A supplies the smaller one of the gains G1 and G2 to the multiplication section 24, as the gain G. Even this modification also makes it possible to produce substantially the same effect as the above first embodiment does.

FIG. 16 depicts a gain calculation operation performed by another gain calculation section 23B according to this modification. It is assumed that the gain calculation section 23B calculates the gain G which is to be multiplied by the line L in the multiplication section 24. In this case, the gain calculation section 23B calculates the gain G, on the basis of the pieces of luminance information IR2, IG2, IB2, and IW2 within the calculation target area RG1 that spans from a 1st line to a line preceding the line L within the frame image F containing the line L. Even this modification also makes it possible to produce substantially the same effect as the above first embodiment does.

Moreover, for example, the gain calculation section 23B may calculate the average current Aavg, on the basis of the pieces of luminance information IR2, IG2, IB2, and IW2 within an image area that precedes the line L and that is equivalent to multiple frame images.

[2. Second Embodiment]

Next, a display device 2 according to a second embodiment will be described. This embodiment includes a gain calculation section 43 that determines the gain G through a plurality of LUTs. Other configurations of this embodiment are substantially the same as those of the above first embodiment. Note that the same reference numerals are assigned to substantially the same components as those of the above first embodiment, and a description thereof will be omitted as appropriate.

FIG. 17 illustrates an exemplary configuration of the display device 2 according to this embodiment. The display device 2 includes an image processing section 40. The image processing section 40 includes a gain calculation section 43 that has two LUTs 48 and 49. The LUT 48 is used to convert an average current Aavg3 into a gain G3, and the LUT 49 is used to convert an average current Aavg4 into a gain G4, as will be described later.

FIG. 18 depicts a gain calculation operation performed by the gain calculation section 43. It is assumed that the gain calculation section 43 calculates the gain G which is to be multiplied by the line L in the multiplication section 24. In this case, the gain calculation section 43 determines the gain G3, on the basis of the pieces of luminance information IR2, IG2, IB2, and IW2 regarding the calculation target area RG1 that spans from the 1st line to the preceding line within the frame image F containing the line L. In addition, the gain calculation section 43 determines the gain G4, on the basis of the preceding frame image F. In more detail, for example, it is assumed that the gain calculation section 43 calculates the gain G which is to be multiplied by a 300th line L within the frame image F(n). In this case, the gain calculation section 43 determines the gain G3, by calculating the average current Aavg3 on the basis of the calculation target area RG1 spanning from a 1st line to a 299th line within the frame image F(n). Then, the gain calculation section 43 determines the gain G4, by calculating the average current Aavg4 on the basis of the frame image F(n-1) which precedes the frame image F(n).

FIG. 19 depicts a relationship between the average current Aavg3 and the gain G3 in the LUT 48 and a relationship between the average current Aavg4 and the gain G4 in the LUT 49. In this example, the LUT 48 exhibits substantially the same property as the LUT 29 according to the above first embodiment (see FIG. 6) does. Meanwhile, the LUT 49 has a property in which the average current Aavg4 increases as the gain G4 increases, as depicted in FIG. 19.

FIG. 20 depicts an exemplary operation performed by the gain calculation section 43. Specifically, FIG. 20 depicts an operation of calculating the gain G for a frame image F(k) to be processed.

At Step S1, first, the gain calculation section 43 calculates the average current Aavg4, on the basis of a preceding frame image F(k-1), and converts the average current Aavg4 into the gain G4 through the LUT 49.

At Step S2, the gain calculation section 43 determines whether or not the average current Aavg4 is smaller than a predetermined current Ath2. If the average current Aavg4 is smaller than the predetermined current Ath2 ("Y" at Step S2), the gain calculation section 43 proceeds to a process at Step S3. Otherwise, if the average current Aavg4 is equal to or larger than the predetermined current Ath2 ("N" at Step S2), the gain calculation section 43 proceeds to a process at Step S9.

If the average current Aavg4 is smaller than the predetermined current Ath2 at Step S2, the gain calculation section 43 performs processes at Steps S3 to S7 in this order for each line L.

At Step S3, first, the gain calculation section 43 outputs the gain G4 as the gain G. Then, the multiplication section 24 performs a multiplication process, on the basis of the gain G.

At Step S4, the gain calculation section 43 calculates the average current Aavg3, on the basis of the calculation target area RG1 corresponding to the line L to be processed, and converts the average current Aavg3 into the gain G3 through the LUT 48.

At Step S5, the gain calculation section 43 determines whether an expression "G4<G3+α" is satisfied or not. In this expression, α denotes a predetermined value. If this expression is satisfied ("Y" at Step S5), the gain calculation section 43 proceeds to a process at Step S6. Otherwise, if the relationship is not satisfied ("N" at Step S5), the gain calculation section 43 proceeds to a process at Step S9.

At Step S6, the gain calculation section 43 determines whether or not the above processing has been applied to all the lines L within the frame image F(k). If the processing has not yet been applied to all the lines L ("N" at Step S6), the gain calculation section 43 proceeds to a process at Step S7. Otherwise, if the processing has been already applied to all the lines L ("Y" at Step S6), the gain calculation section 43 terminates this processing flow.

At Step S7, the gain calculation section 43 sets the next line L as a process target. Then, the gain calculation section 43 returns to the process at Step S3.

If the expression is not satisfied at Step S5 ("N" at Step S5), the gain calculation section 43 determines the gain G for each of all the remaining lines L within the frame image F(k), on the basis of the calculation target area RG1, at Step S9. In more detail, the gain calculation section 43 calculates the average current Aavg3 for each line L to be processed, on the basis of the calculation target area RG1. Then, the gain calculation section 43 converts the average current Aavg3 into the gain G3 through the LUT 48, outputting the gain G3 as the gain G.

Through the above steps, this processing flow ends.

Parts (A) to (C) of FIG. 21 depict an exemplary operation performed by the display device 2 during the ABL process. In more detail, Part (A) depicts the frame images F entered in the display device 2, Part (B) depicts the gain G, and Part (C) depicts display images D provided by the EL display section 30.

When the frame image F(n-1) is supplied, the gain calculation section 43 starts an operation based on the processing flow as depicted in FIG. 20. In this example, the average current Aavg4 becomes sufficiently low, because the preceding frame image F(n-2) is a black image. Accordingly, the average current Aavg4 becomes smaller than the predetermined current Ath2 (Step S2). As a result, the gain calculation section 43 proceeds to the loop process at Steps S3 to S7. In this case, since the image in the calculation target area RG1 is also a black image, the gain G3 becomes high. However, it is possible for the gain calculation section 43 to prevent the expression at Step S5 from being satisfied, by setting the predetermined vale α appropriately. As a result, the gain calculation section 43 proceeds to the process at Step S9. At Step S9, the gain calculation section 43 calculates the gain G for each line L, and the gain G becomes constant.

Furthermore, when the frame image F(n) is supplied, the gain calculation section 43 starts an operation based on the processing flow as depicted in FIG. 20. In this example, the average current Aavg4 becomes sufficiently low, because the preceding frame image F(n−1) is a black image. Therefore, the gain G4 also becomes sufficiently low, as depicted in FIG. 19. In this case, the gain G3 becomes low, because the image in the calculation target area RG1 is a white image. Accordingly, if the expression at Step S5 is satisfied, the gain calculation section 43 performs the loop process at Steps S3 to S7. In the loop process at Steps S3 to S7, the gain calculation section 43 outputs the gain G4 for each of multiple lines L to be processed, as the gain G (Step S3). As a result, the gain G for each of the multiple lines L to which the loop process at Steps S3 to S7 has been applied becomes constant and low, as in part W1 of FIG. 12. After performing this loop process, the gain calculation section 43 calculates the gain G for each line L. The calculated gain G gradually increases, as in part W2 of FIG. 12.

As described above, the display device 2 determines the gains G3 and G4 from the current frame image F(n) and the preceding frame image F(n−1), respectively, and compares the gains G3 and G4. Therefore, immediately after the supplied frame image F(n) is changed from a black image to a white image, the display device 2 first decreases the gain G, and then gradually approaches the gain G to a desired gain. This processing enables the image quality to be enhanced. Specifically, for example, in the display device 1 according to the first embodiment, as described above, the gain G becomes slightly high, immediately after the supplied frame image F(n) is changed from a black image to a white image, as depicted in FIG. 8. This may cause a viewer to perceive unnatural feeling. In contrast, the display device 2 according to this embodiment operates to first decrease the gain G immediately after the frame image F(n) is changed from a black image to a white image, and then gradually approach the gain G to a desired gain, as depicted in FIG. 21. This processing prevents a viewer from perceiving unnatural feeling, thereby enabling the image quality to be enhanced.

As described above, the display device 2 determines respective gains from a current frame image and a preceding frame image, and compares both frame images. This configuration reduces the risk of causing a viewer to feel any unnatural feeling, thus enabling the image quality to be enhanced. Other effects produced by the second embodiment are the same as those produced by the above first embodiment.

(Modification 2-1)

The modifications 1-1 and 1-2 of the above first embodiment may be applied to the display device 2 of the above second embodiment.

[3. Third Embodiment]

Next, a display device 3 according to a third embodiment will be described. The third embodiment includes a white-pixel correction section that corrects luminance of each white sub-pixel SPix on the basis of the gain G. Other configurations of this embodiment are substantially the same as those of the above first embodiment. Note that the same reference numerals are assigned to substantially the same components as those of the display device 1 according to the above first embodiment, and a description thereof will be omitted as appropriate.

FIG. 22 depicts an exemplary configuration of a display device 3 according to this embodiment. The display device 3 includes an image processing section 50 that includes a gain calculation section 53 and a white-pixel correction section 55.

The gain calculation section 53 calculates average current Aavg of the calculation target area RG, and determines the gain G through a LUT 59, on the basis of the calculated average current Aavg, similar to the gain calculation section 23 according to the above first embodiment.

The white-pixel correction section 55 corrects only the luminance information IW2 among the pieces of luminance information IR2, IG2, IB2, and IW2 contained in the image signal Sp24, on the basis of the gain G. In addition, the white-pixel correction section 55 outputs the corrected luminance information IW2 together with the other pieces of luminance information IR2, IG2, and IB2, as an image signal Sp25. The white-pixel correction section 55 has a LUT 56 used to correct the luminance information IW2. Specifically, the LUT 56 is used to obtain a correction amount ΔI for the luminance information IW2, on the basis of the gain G.

FIG. 23 depicts a relationship between the gain G and the correction amount ΔI in the LUT 56. In this example, as the gain G increases, the correction amount ΔI decreases.

Parts (A) to (C) of FIG. 24 depict an exemplary operation performed by the display device 3. In more detail, Part (A) depicts the pieces of luminance information IR2, IG2, IB2, and IW2 before the multiplication section 24 performs the multiplication process, Part (B) depicts the pieces of luminance information IR2, IG2, IB2, and IW2 after the multiplication section 24 performs the multiplication process, and Part (C) depicts the pieces of luminance information IR2, IG2, IB2, and IW2 after the white-pixel correction section 55 performs the correction process.

In this example, the multiplication section 24 first individually multiplies the pieces of luminance information IR2, IG2, IB2 ("0" in this example), and IW2 as depicted in Part (A) of FIG. 24 by the gain G of 1 or lower (see Part (B) of FIG. 24). Then, the white-pixel correction section 55 corrects the luminance information IW2 regarding the white sub-pixel SPix, which is one of the pieces of resultant luminance information IR2, IG2, IB2, and IW2, so as to increase by the correction amount ΔI. Thus, the white-pixel correction section 55 increases the luminance information IW2 by the decrease in the luminance which is caused through the multiplication process of the multiplication section 24.

As described above, the display device 3 uniformly decreases the pieces of luminance information IR2, IG2, IB2, and IW2 by using the gain G, and then increases the luminance information IW2 by the decrease in the luminance. This configuration decreases the power consumption. Specifically, since the white (W) sub-pixel SPix has no color filter, as depicted in FIG. 3, it exhibits a higher light emitting efficiency than the red (R), green (G), and blue (B) sub-pixel SPix with a color filter does. Therefore, the display device 3 decreases the power consumption by substituting the light emitted from the white (W) sub-pixel SPix for the light emitted from the red (R), green (G), and blue (B) sub-pixels SPix. Note that the balance of the luminances of the red light, green light, and blue light may be slightly changed, as depicted in Parts (A) and (C) of FIG. 24. Accordingly, preferably, the gain calculation section 53 and the white-pixel correction section 55 may operate to the extent that the above change does not affect the image quality.

In the above way, this embodiment corrects the luminance information IW2, on the basis of the gain G, thereby decreasing the power consumption. Other effects produced by this embodiment are substantially the same as those produced by the above first embodiment.

[4. Application Examples]

Next, a description will be given of application examples of the display devices that have been described in the above embodiments and modifications thereof.

FIG. 25 illustrates an appearance of a TV unit that includes any of the display devices according to the above embodiments and the like. This TV unit is provided with, for example, an image display screen section 510 that includes a front panel 511 and a filter glass 512. The TV unit includes any of the display devices according to the above embodiments and the like.

The display devices according to the above embodiments and the like are applicable to electronic apparatuses of various fields, including digital cameras, notebook personal computers, portable terminal devices such as portable phones, portable game machines, and video cameras, in addition to TV units as described above. In other words, the display devices according to the above embodiments and the like are applicable to electronic apparatuses of various fields which display an image.

Up to this point, the present technology has been described by giving the embodiments, modifications thereof, and the application examples to electronic apparatuses. However, the present technology is not limited to the above embodiments and the like, and various modifications thereof may be contemplated.

In the above embodiments and the like, for example, the gain calculation section 23 determines the gain G, on the basis of the image signal Sp22 output from the RGBW conversion section 22. However, there is no limitation on a configuration of determining the gain G. Alternatively, the gain G may be determined on the basis of the image signal Sp21 output from the linear gamma conversion section 21, for example, as depicted in FIG. 26. Furthermore, the gain G may be determined on the basis of the image signal Sp0 output from the input section 11, for example, as depicted in FIG. 27.

In the above embodiments and the like, the multiplication section 24 is disposed downstream of the RGBW conversion section 22. However, there is no limitation on an arrangement order of these components. Alternatively, the multiplication section 24 may be disposed upstream of the RGBW conversion section 22, for example, as depicted in FIG. 28. In this case, the gain calculation section 23 may determine the gain G, for example, on the basis of the image signal Sp21 output from the linear gamma conversion section 21.

In the first and second embodiments and the like, each pixel Pix includes four sub-pixels SPix, or the red (R), green (G), blue (B), and white (W) sub-pixels SPix. However, there is no limitation on the configuration of each pixel Pix. Alternatively, each sub-pixel SPix may include three sub-pixels SPix, or red (R), green (G), blue (B) sub-pixels SPix, for example, as depicted in FIG. 29.

In the above embodiments and the like, the techniques are applied to EL display devices. However, there is no limitation on the applications of the above techniques. Alternatively, for example, the techniques may be applied to liquid crystal display devices.

Furthermore, the technology encompasses any possible combination of some or all of the various embodiments described herein and incorporated herein.

It is possible to achieve at least the following configurations from the above-described example embodiments of the disclosure.

(1) A display device, including:
a display section displaying an image by performing line sequential scanning;
a gain calculation section determining a gain, on the basis of a first partial image in a first frame image that includes a process target line; and
a correction section correcting pixel luminance information regarding the process target line, on the basis of the gain.

(2) The display device according to (1), wherein the gain calculation section determines the gain, on the basis of, in addition to the first partial image, a second partial image in a second frame image, the second frame image preceding the first frame image.

(3) The display device according to (2), wherein
the first partial image is located in a location that precedes the process target line in the first frame image,
the second partial image is located in an end portion of the second frame image, and
a sum of the number of pieces of pixel luminance information regarding the first partial image and the number of pieces of pixel luminance information regarding the second partial image is equal to the number of pieces of pixel luminance information regarding each frame image.

(4) The display device according to (2) or (3), wherein the gain calculation section determines an average current to be consumed when the display section displays the first partial image and the second partial image, and decreases the gain as the average current increases.

(5) The display device according to (4), wherein the gain calculation section determines the average current by thinning out respective pieces of pixel luminance information regarding the first partial image and the second partial image.

(6) The display device according to (1), wherein
the gain calculation section determines a first gain portion on the basis of the first partial image and a second gain portion on the basis of a second partial image in a second frame image, the second frame image preceding the first frame image, and
the gain calculation section determines the gain, on the basis of the first gain portion and the second gain portion.

(7) The display device according to (6), wherein
the gain calculation section determines a first average current to be consumed when the display section displays the first partial image, and decreases the first gain portion as the first average current increases, and
the gain calculation section determines a second average current to be consumed when the display section displays the second partial image, and decreases the second gain portion as the second average current increases.

(8) The display device according to (6) or (7), wherein the gain calculation section sets the gain to a smaller one of the first gain portion and the second gain portion.

(9) The display device according to (1), wherein the gain calculation section determines an average current to be consumed when the display section displays the first partial image, and decreases the gain as the average current increases.

(10) The display device according to (1), wherein
the gain calculation section determines a first gain portion on the basis of the first partial image and a third gain portion on the basis of an entire second frame image, the second frame image preceding the first frame image, and
the gain calculation section determines the gain, on the basis of the first gain portion and the third gain portion.

(11) The display device according to (10), wherein
the gain calculation section determines a first average current to be consumed when the display section displays the first partial image, and decreases the first gain portion as the first average current increases, and
the gain calculation section determines a third average current to be consumed when the display section displays the second frame image, and increases the third gain portion as the third average current increases.
(12) The display device according to (10) or (11), wherein
the gain calculation section makes a comparison between the first gain portion and the third gain portion, and sets the gain to the first gain portion or the third gain portion, in accordance with a result of the comparison.
(13) The display device according to any one of (1) to (12), wherein
the display section includes a plurality of display pixels, and
each of the display pixels includes a first sub-pixel, a second sub-pixel, a third sub-pixel, and a fourth sub-pixel, the first sub-pixel, the second sub-pixel, and the third sub-pixel corresponding to respective wavelengths that are different from one another, and the fourth sub-pixel emitting color light of a color that is different from a color of color light which the first sub-pixel emits, a color of color light which the second sub-pixel emits, and a color of color light which the third sub-pixel emits.
(14) The display device according to (13), wherein
the pixel luminance information is luminance information regarding each of the sub-pixels, and
the correction section increases the respective pieces of pixel luminance information regarding the first sub-pixel, the second sub-pixel, the third sub-pixel, and the fourth sub-pixel in the process target line, as the gain increases.
(15) The display device according to (14), wherein the correction section increases the pixel luminance information regarding the fourth sub-pixel in the process target line, as the gain decreases.
(16) The display device according to any one of (13) to (15), wherein the first sub-pixel, the second sub-pixel, the third sub-pixel, and the fourth sub-pixel emit the red color light, the green color light, the blue color light, and the white color light, respectively.
(17) An image processing device, including:
a gain calculation section determining a gain, on the basis of a first partial image in a first frame image that includes a process target line; and
a correction section correcting pixel luminance information regarding the process target line, on the basis of the gain.
(18) An image processing method, including:
determining a gain, on the basis of a first partial image in a first frame image that includes a process target line; and
correcting pixel luminance information regarding the process target line, on the basis of the gain.

The present disclosure contains subject matter related to that disclosed in Japanese Priority Patent Application JP 2012-164332 filed in the Japan Patent Office on Jul. 25, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display device, comprising:
a display section displaying an image by performing line sequential scanning;
a gain calculation section determining a gain for each line, on the basis of a first partial image in a first frame image that includes a process target line, the first partial image being located in a location that precedes the process target line in a scanning direction of the first frame image; and
a correction section correcting pixel luminance information regarding the process target line, on the basis of the gain, wherein
the gain calculation section determines a first gain portion on the basis of the first partial image and a third gain portion on the basis of an entire second frame image, the second frame image preceding the first frame image,
the gain calculation section determines the gain, on the basis of the first gain portion and the third gain portion, and
the gain calculation section makes a comparison between the first gain portion and the third gain portion, and sets the gain to the first gain portion or the third gain portion, in accordance with a result of the comparison.
2. The display device according to claim 1, wherein
the display section includes a plurality of display pixels, and
each of the display pixels includes a first sub-pixel, a second sub-pixel, a third sub-pixel, and a fourth sub-pixel, the first sub-pixel, the second sub-pixel, and the third sub-pixel corresponding to respective wavelengths that are different from one another, and the fourth sub-pixel emitting color light of a color that is different from a color of color light which the first sub-pixel emits, a color of color light which the second sub-pixel emits, and a color of color light which the third sub-pixel emits.
3. The display device according to claim 2, wherein
the pixel luminance information is luminance information regarding each of the sub-pixels, and
the correction section increases the respective pieces of pixel luminance information regarding the first sub-pixel, the second sub-pixel, the third sub-pixel, and the fourth sub-pixel in the process target line, as the gain increases.
4. The display device according to claim 2, wherein the first sub-pixel, the second sub-pixel, the third sub-pixel, and the fourth sub-pixel emit the red color light, the green color light, the blue color light, and the white color light, respectively.

* * * * *